(12) United States Patent
Smithwick et al.

(10) Patent No.: US 10,154,253 B2
(45) Date of Patent: Dec. 11, 2018

(54) MULTI-VIEW DISPLAYS USING IMAGES ENCODED WITH ORBITAL ANGULAR MOMENTUM (OAM) ON A PIXEL OR IMAGE BASIS

(71) Applicants: DISNEY ENTERPRISES, INC., Burbank, CA (US); CAMBRIDGE ENTERPRISE LIMITED, Cambridge (GB)

(72) Inventors: Quinn Y. Smithwick, Pasadena, CA (US); Xuefeng Li, Cambridge (GB); Jiaqi Chu, Cambridge (GB); Daping Chu, Cambridge (GB)

(73) Assignees: DISNEY ENTERPRISES, INC., Burbank, CA (US); CAMBRIDGE ENTERPRISE LIMITED, Cambridge (GB)

( * ) Notice: Subject to any disclaimer, the term of this patent is extended or adjusted under 35 U.S.C. 154(b) by 104 days.

(21) Appl. No.: 15/250,341

(22) Filed: Aug. 29, 2016

(65) Prior Publication Data
US 2018/0063519 A1   Mar. 1, 2018

(51) Int. Cl.
| | |
|---|---|
| *H04N 13/32* | (2018.01) |
| *H04N 13/351* | (2018.01) |
| *H04N 13/398* | (2018.01) |
| *G02B 27/22* | (2018.01) |
| *H04N 13/363* | (2018.01) |
| *H04N 13/307* | (2018.01) |
| *G02B 27/28* | (2006.01) |

(52) U.S. Cl.
CPC .......... *H04N 13/32* (2018.05); *G02B 27/225* (2013.01); *G02B 27/2264* (2013.01); *H04N 13/307* (2018.05); *H04N 13/351* (2018.05); *H04N 13/363* (2018.05); *H04N 13/398* (2018.05); *G02B 27/283* (2013.01)

(58) Field of Classification Search
CPC ................................................ H04N 13/0418
See application file for complete search history.

(56) References Cited

U.S. PATENT DOCUMENTS

| | | |
|---|---|---|
| 6,603,504 B1 | 8/2003 | Son et al. |
| 2010/0013696 A1* | 1/2010 | Schmitt ................. G01S 7/024 342/54 |

(Continued)

*Primary Examiner* — Tracy Y. Li
(74) *Attorney, Agent, or Firm* — Marsh Fischmann & Breyfogle LLP; Kent A. Lembke

(57) ABSTRACT

A multi-view display system or optical vortex 3D display in a multi-view or multilayer embodiment or configuration. The new 3D display system encodes and decodes images into independent modes of optical angular momentum (OAM). In some embodiments, the 3D display system uses pixel-based OAM. In such systems, transformation optics are used to sort the OAM modes. These transformation optics convert the OAMs' spiral wavefronts to linear gradient wavefronts, which are then deflected by a simple lens. The transformation optics, thus, are used in image-based (per pixel) decoding/sorting. In other embodiments, the 3D display system uses image-based OAM. In such systems, convolution of the OAM modes with the image is used rather than the direct modulation of the OAM mode and the image (as used in the prior system discussed above) for image-based encoding and decoding/sorting of images in different OAM modes.

16 Claims, 19 Drawing Sheets

(56) References Cited

U.S. PATENT DOCUMENTS

| | | | |
|---|---|---|---|
| 2010/0331689 A1* | 12/2010 | Wegener | A61B 8/06 600/443 |
| 2011/0157167 A1* | 6/2011 | Bennett | G06F 3/14 345/419 |
| 2012/0327199 A1* | 12/2012 | Chen | G02B 27/2214 348/51 |
| 2015/0201186 A1 | 7/2015 | Smithwick | |
| 2016/0069804 A1* | 3/2016 | Ashrafi | G01N 21/59 356/432 |
| 2016/0371866 A1* | 12/2016 | Ng | G06T 11/60 |
| 2017/0012732 A1* | 1/2017 | Kowalevicz | H01Q 21/00 |

* cited by examiner

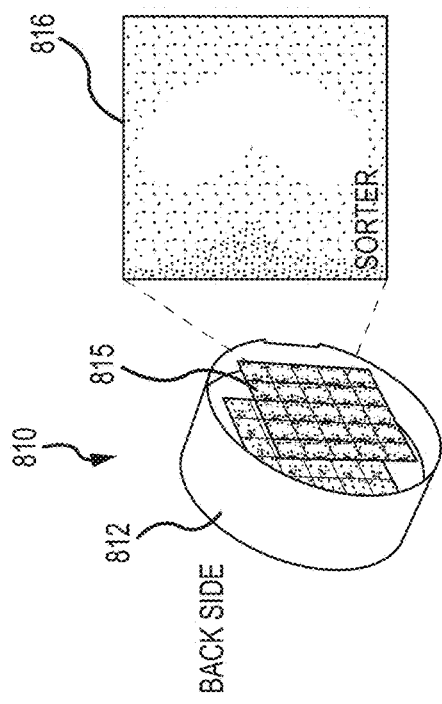
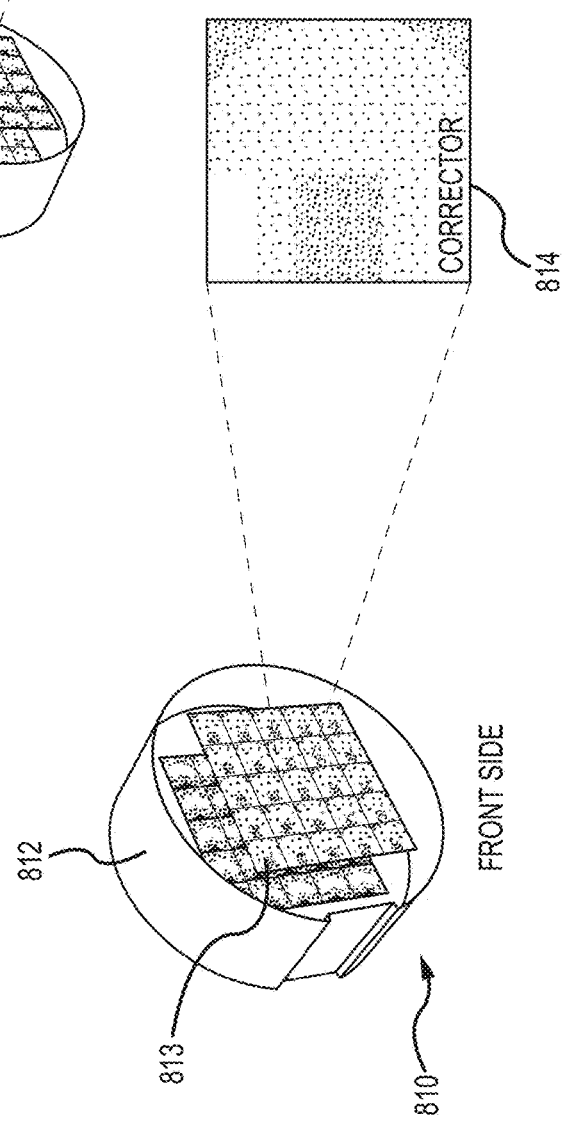

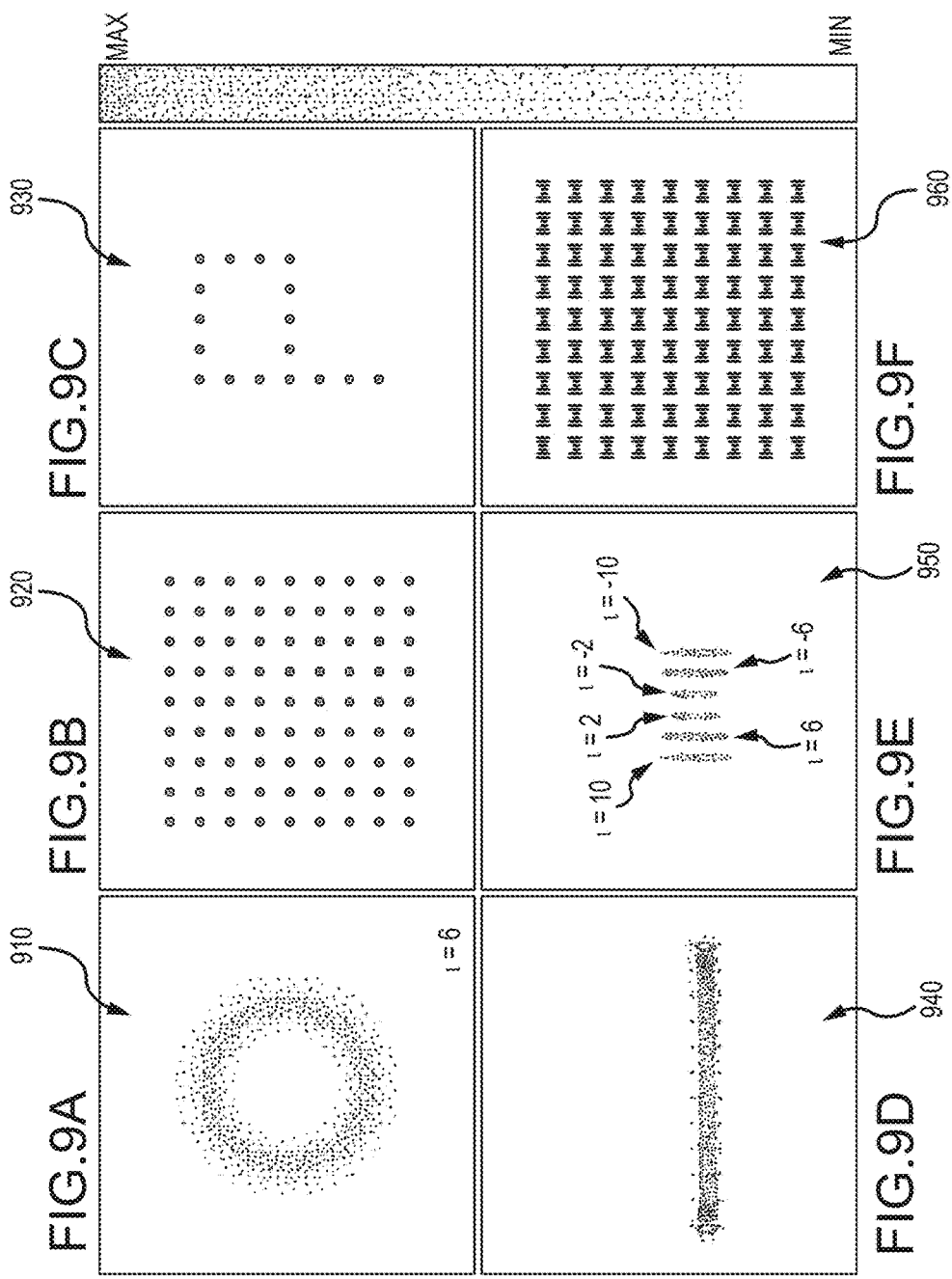

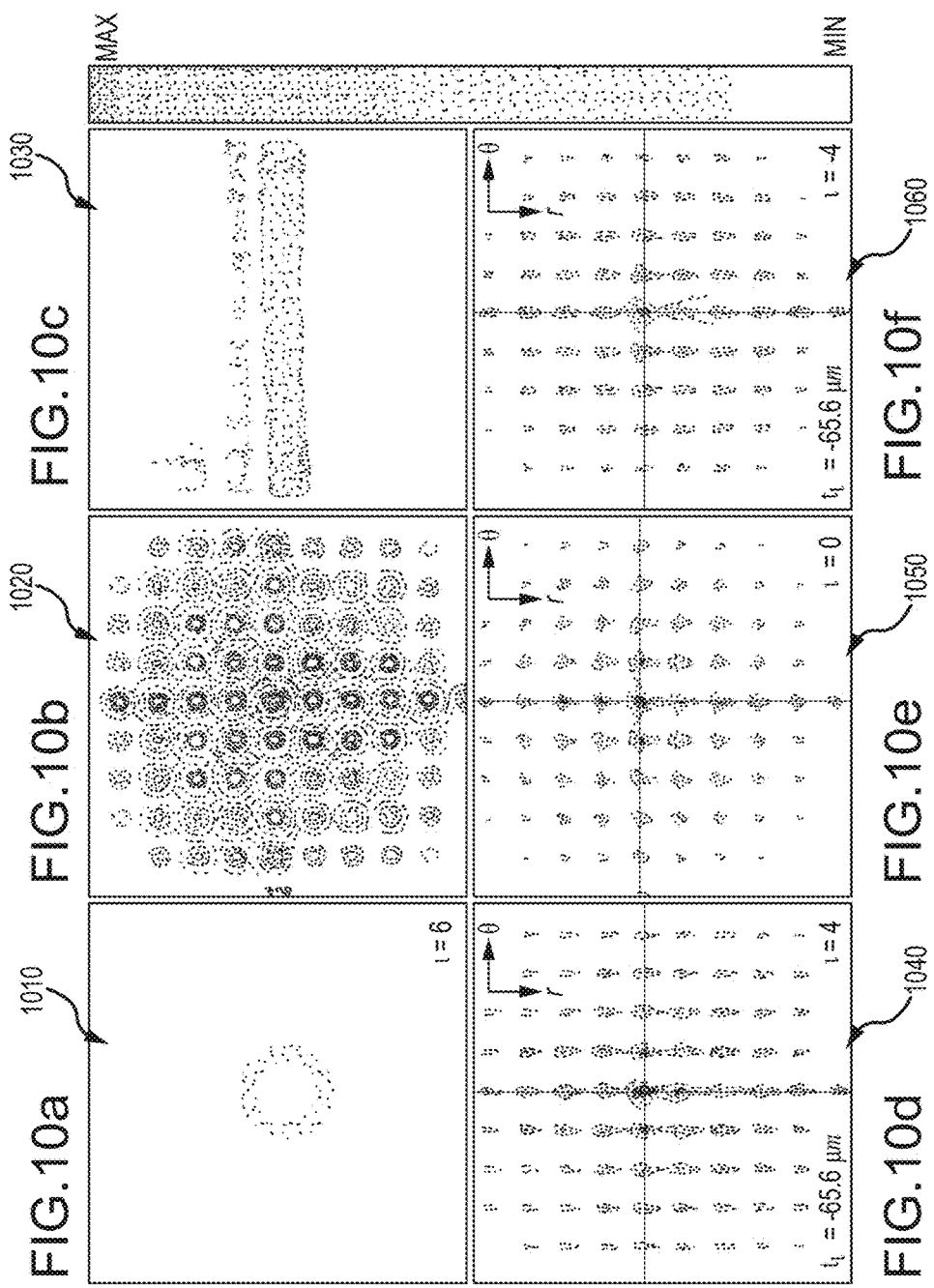

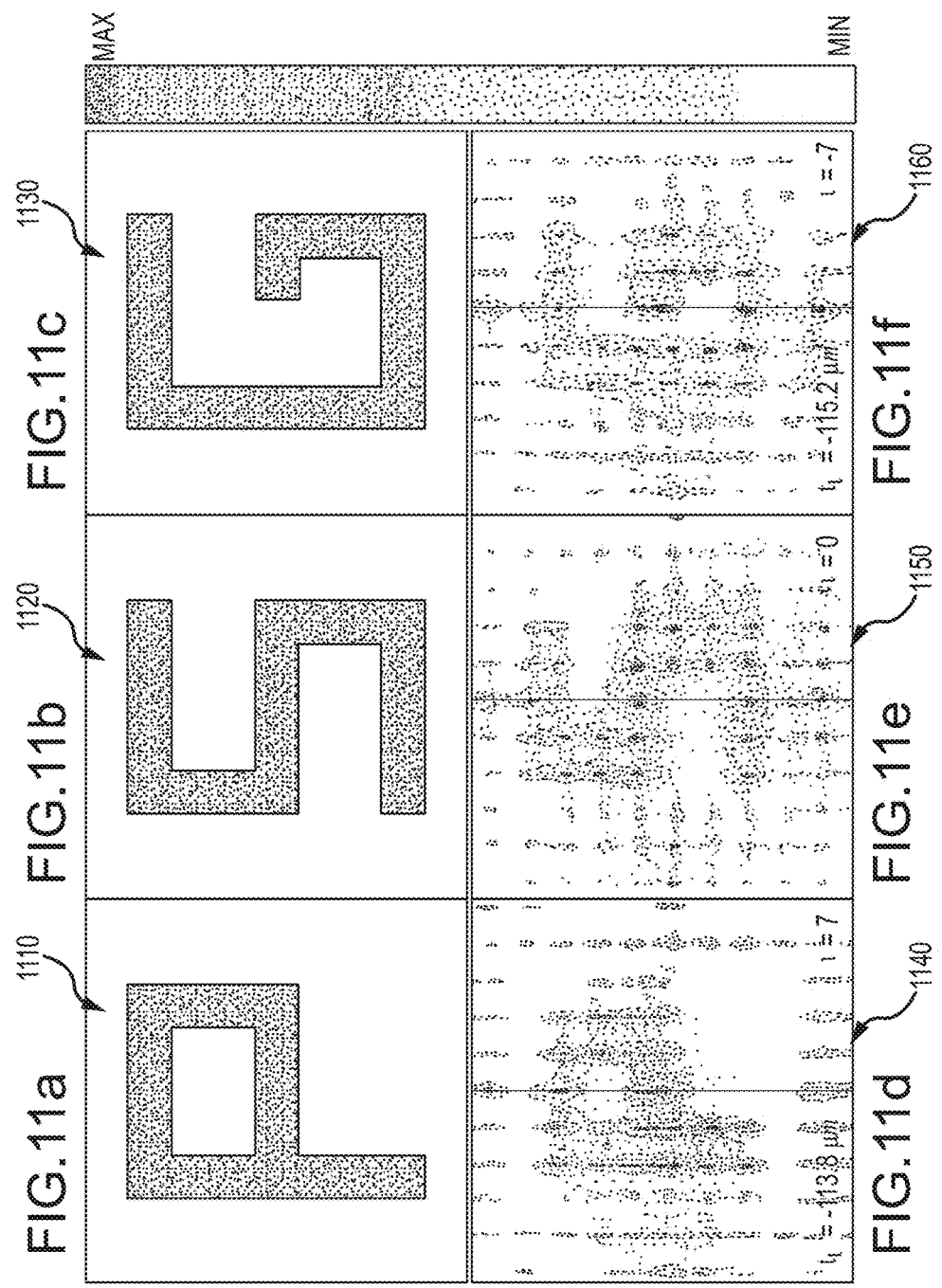

MULTI-VIEW DISPLAYS USING IMAGES ENCODED WITH ORBITAL ANGULAR MOMENTUM (OAM) ON A PIXEL OR IMAGE BASIS

BACKGROUND

1. Field of the Description

The present invention relates, in general, to autostereoscopic displays, to holography and to holographic displays, and, more particularly, to displays adapted to utilize optical vortices to create multi-view (or multi-autostereoscopic) displays including, but not limited to, three dimensional (3D) displays.

2. Relevant Background

Recently, the demand for 3D displays has rapidly expanded both for theater and similar settings for larger audiences and for smaller applications, such as for home theaters and televisions, with a smaller number of viewers. One approach to providing 3D displays is labeled or named "multi-view 3D displays." In these displays, a set of two dimensional (2D) images are directed into different view zones, which provides different views for each eye at different locations. Multi-view 3D displays are desirable in part because the different views for each eye provide multiple stereo views and 3D parallax. Another approach is the use of so called multi-planar 3D displays. In these displays, a set of 2D images are directed onto different depth layers. Multi-planar 3D displays are desirable in part because they provide 3D depth, parallax, and accommodation cues.

One challenge facing designers and manufacturers of multi-view/multi-planar 3D displays is the mechanism or technique of distributing the 2D images into the different view zones (e.g., into different viewer's eyes) or onto different depths. All eyes or viewers' eyes are essentially identical except for their placement in a view zone (e.g., all are spaced apart about 2.5 inches), and, similarly, projection screens that can be placed apart at different depths in a multi-view 3D display are typically made of the same material. Light intended for different eyes or different screen layers must be accurately and precisely directed only where it is intended for a multi-view or multi-planar 3D display to properly function. This may involve use of temporal multiplexing, directional backlights, spatially multiplexed parallax barriers/lenticulars, and the like. Alternatively, some device has to be utilized to help the eyes and screens discriminate between light intended for them (the eyes or screens) and light intended for others (other eyes or other screens), and such discrimination may be performed using light wavelengths, polarization of the light (e.g., with a viewer wearing special 3D glasses), or synchronized shuttering between an image source and viewers' eyes or a screen.

To better understand challenges associated with providing 3D displays, it may be informative to examine a related analogy with 3D stereo with colored or polarized glasses. Colored glasses (e.g., anaglyph glasses) and polarized glasses are common devices that are used to help a viewer's eye to discriminate between light intended for that particular eye and light intended for another eye (e.g., for their other eye). In 3D viewing with colored glasses, left and right images are encoded using chromatically opposite colors such as red and cyan, and the glasses have matching colored filters positioned over each of the wearing viewer's eyes. The viewer's brain acts to merge the two different colored images into a single full color image, but sometimes this can result in binocular color rivalry and eye strain. Some glass technologies use two slightly different wavelengths for red, green, and blue for each eye, as the eye is not sensitive to slight color differences. The left and right eyes of the viewer see images of similar color and brightness, which relieves retinal rivalry. However, these glasses are expensive to fabricate as the filters have to be extremely selective to wavelengths that are very close to each other. A further limit of wavelength-based 3D glasses is that some designs only use two sets of wavelengths, which limits their use to two or stereo views.

Polarized glasses similarly help discriminate between views intended for the viewer's left and right eyes. In these 3D systems, left-right images are encoded using oppositely oriented polarized light, and the viewers each wear glasses with matching polarization filters over each eye. The human eye is largely insensitive to polarization so that each eye of a viewer wearing polarized glasses sees images of similar color and brightness. Polarized light is a combination of two polarization directions, e.g., horizontal and vertical. As a result, a limit with the use of polarized light is that a 3D display system designer can only encode two views using only polarization (as is the case with some wavelength-based 3D display systems).

Display systems using color/wavelength and polarized encoding project onto screens. Each screen, being projected upon, sends the encoded light into all directions, and transmission filters placed (by 3D glasses) over each eye act to select the appropriate image for that particular eye. Again, only two polarizations or two sets of wavelengths are needed to discriminate between a viewer's left and right eyes. Such an arrangement is adequate for use in a cinema setting where each viewer does not change their viewpoint. However, for multi-view autostereo displays (i.e., displays in which viewers do not wear special eyewear), more than two images must be encoded, and a screen would need to reflect (or bend) light into a different direction based upon the wavelength or polarization. Layer discrimination is also problematic in this regard because it would require a color/wavelength or polarization-selective scattering/transparent screen.

SUMMARY

Previously, it was recognized that there remained a need for new designs for multi-view 3D displays (or simply "3D displays" or "3D display systems" or, more specifically, "OAM 3D displays" or "optical vortex 3D displays") that presented more than two images or views to an audience or group of viewers. 3D displays were taught that were configured to discriminate between light intended for many views or planes (or at least more than two views or planes). The 3D displays were designed using the properties of light for such discrimination, e.g., the amplitude, phase, color, polarization, and/or other properties of the light. This approach provided autostereo multi-view 3D displays or multi-layer displays with a single projector and unsynchronized passive screens.

In some of these prior implementations, the optical vortex 3D display was configured to encode light that was projected onto or delivered to a display screen. A screen, which may be labeled a decoding screen, was included in the system that was adapted or configured to know what to do with the encoded light, e.g., to know how to demultiplex the light and direct it into differing view zones (or focal planes) or know to display or pass the light to a next screen/layer. In brief, the prior optical vortex 3D displays were adapted to provide three or more views/view zones or layers by encoding light in a way that is decodable and demultiplexed by one or more decoding screens.

One useful feature of optical vortices is that each has a wavefront that has a spiral phase pattern that spins as it travels. The wavefront of the optical vortex can be encoded according to three or more orthogonal encoding profiles such as to define the twist of the wavefront (e.g., to provide light with more than two separable spiral phase patterns). In this way, one can use optical vortices to encode different information into the light associated with differing view images (e.g., identify each of two, three, or more view images intended for three or more view zones or view layers), project light, and at a different location decode the light into separate views or layers. Stated differently, orbital angular momentum (OAM) multiplexing may be used to support combination of three or more view images or image streams that can later be separated at the display screen/device, and optical vortex and OAM are terms that may be used interchangeably in this description.

The encoded spiral beams of light can be combined into a single combined beam (such as via an array of beam combiners or by multiple encodings on a single spatial light modulator (SLM)) that can be projected or transmitted onto one or more decoding screens that act to separate out and selectively display the view images associated with each of the spiral beams or spiral phase patterns provided by the optical vortices. To this end, the prior 3D display systems used a hologram to encode light with the spiral phase patterns, which allowed the display system to avoid use of spiral phase plates or other solid/physical elements to create the spiral beams (although these may be used in some embodiments of a 3D display according to the present description). Similarly, holograms (or spiral phase plates) were used to decode the projected encoded beam such as with the use of one or more holograms, e.g., a decoding hologram screen(s).

With this background or development platform in place and understood, the inventors discovered several techniques for implementing a 3D display system or optical vortex 3D display (in a multi-view or multilayer embodiment or configuration). The new 3D display system(s) encode and decode images into independent modes of optical angular momentum (OAM). In some embodiments, the 3D display system uses pixel-based OAM. In such systems, transformation optics are used to sort the OAM modes. These transformation optics convert the OAMs' spiral wavefronts to linear gradient wavefronts, which are then deflected by a simple lens. The transformation optics, thus, are used in image-based (per pixel) decoding/sorting. In other embodiments, the 3D display system uses image-based OAM. In such systems, convolution of the OAM modes with the image is used rather than the direct modulation of the OAM mode and the image (as used in the prior system discussed above) for image-based encoding and decoding/sorting of images in different OAM modes.

More particularly, a multi-view (or multi-autostereoscopic) display (e.g., a three dimensional (3D) display system) is provided that includes a display controller providing light associated with three or more two dimensional (2D) images. The 3D display system also includes an optical assembly encoding the light associated with the three or more 2D images with optical angular momentum (OAM), and a projection assembly displaying the three or more images on three or more screens positioned at three or more differing focal planes or displaying the three or more 2D images in three or more view zones to provide an autostereoscopic display.

In some embodiments, the optical assembly (or transformation optics) is configured to encode the light associated with each of the three or more 2D images into an array of OAM beams. In this regard, all the OAM beams of each of the arrays of OAM beams are encoded with an OAM mode that differs for each of the arrays of the OAM beams. Further, each of the OAM beams corresponds to a pixel of one of the three or more 2D images, e.g., the encoding is performed on a pixel-by-pixel basis. To provide this pixel encoding, the optical assembly may include three or more spiral phase plate arrays (e.g., one for each of the images to be encoded) configured to encode light into a plurality of OAM beams according to one of the OAM modes. Further, the optical assembly further comprises a beamsplitter combining the OAM beams from the spiral phase plate arrays into a multiplexed beam. The projection assembly may include an optical element including an array of sorters configured to receive the multiplexed beam and direct light associated with the pixels of each of the differing three or more 2D images into a differing view zone.

In other embodiments, the optical assembly provides the encoding through convolution of differing OAM modes on an image-by-image basis. In such embodiments, the projection assembly is adapted to decode or sort the three or more 2D images after the convolution by the optical assembly. Also, the optical assembly may include a differing SPP (e.g., one SPP for each of the images to be encoded) for performing the convolution of the light associated with the three or more 2D images based on the differing OAM modes.

BRIEF DESCRIPTION OF THE DRAWINGS

FIGS. 8A and 8B show front and back sides of an optical element used to provide corrector and sorter arrays, respectively, as may be provided in a 3D display system of the present description such as in the system of FIG. 7;

FIGS. 9A-9F show graphically results of a simulation of operation of an optical vortex 3D display system of the present description (such as the system of FIG. 7 modified to include the optical element of FIGS. 8A and 8B);

FIGS. 10A-10F show graphically results of an experimentation implementing the concepts of a pixel-based encoding of OA modes such as with the 3D display system of FIG. 7;

FIGS. 11A-11F show graphically use of image masks in the optics of a 3D display system of the present description (such as the 3D display system of FIG. 7);

DETAILED DESCRIPTION

Figure 1:
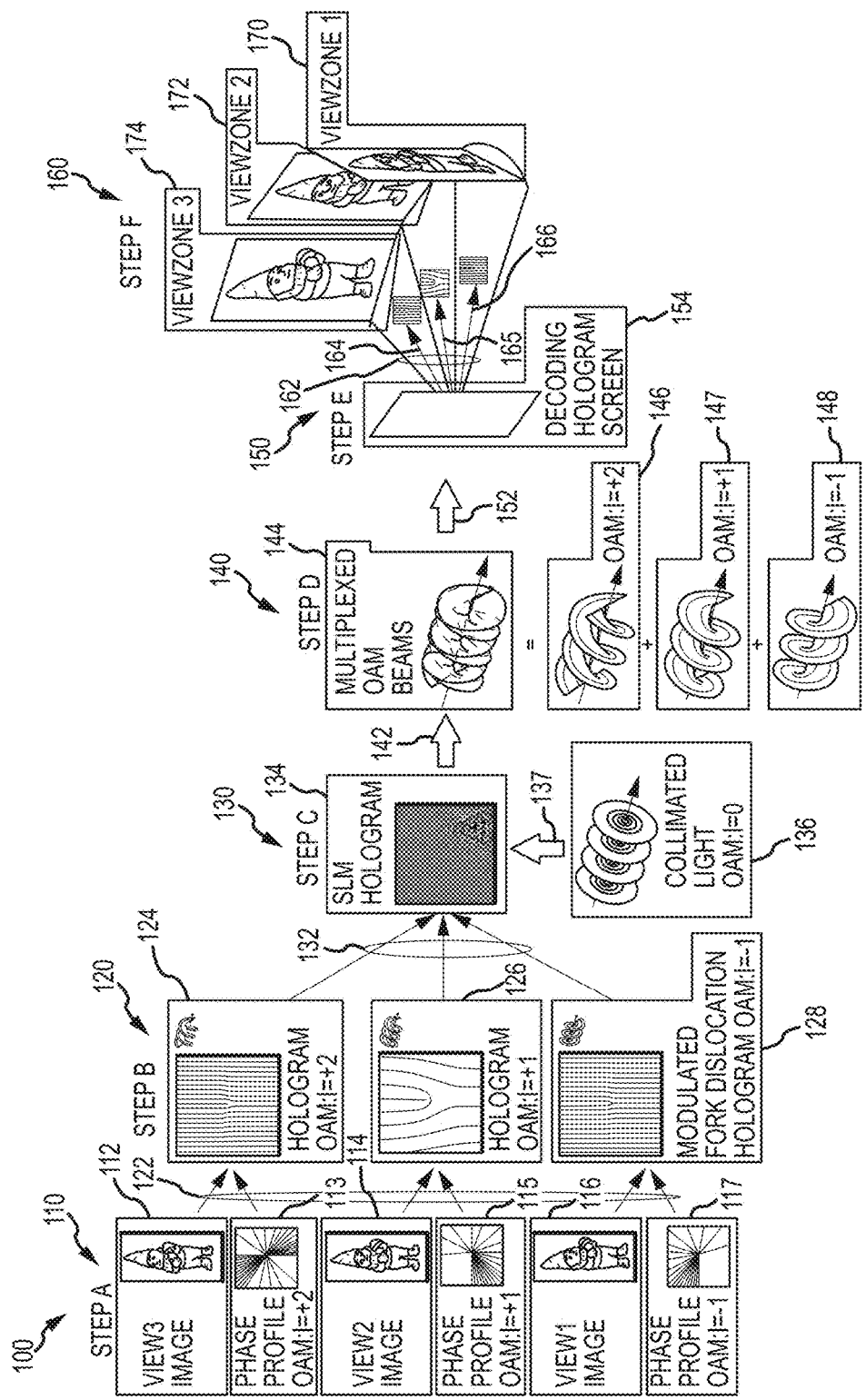
FIG. 1 illustrates schematically components of an optical vortex multi-view display during operation (during performance of a 3D display method) to provide three or more views in different view zones via a decoding screen.

Briefly, the present description teaches a 3D display (or optical vortex 3D display or optical vortex 3D display system) that is configured specifically to transition away from displays that utilize or rely upon polarization and wavelength encoding. To assist in understanding the new 3D display systems, previous display system designs that utilized holograms for encoding/decoding are first described with reference to FIGS. 1-5. The new 3D display systems or optical vortex 3D display systems are then described in detail, and the new 3D display systems are designed to use either pixel-based OAM with transformation optics or image-based OAM with convolution of the OAM modes.

As will be clear from the discussion of the displays of FIGS. 1-5, previous techniques for providing a 3D display using OAM concepts involved pixel-based OAM using holograms to sort the OAM modes and direct modulation of the OAM mode by the image (e.g., passed through the OAM spiral wavefront through a transparency before transmitting). The new 3D display systems taught herein differ in a number of significant ways that provide useful advantages to practical implementations of such display systems.

Particularly, with regard to the pixel-based 3D display systems, the use of transformation optics rather than a hologram may be more light efficient. It also uses a different optical setup than using a hologram for encoding/decoding, as there are separate transformation optics and phase correction optics. The transformation optics can be made on a single monolithic device for precise alignment.

With regard to the image-based 3D display systems, the previous use of direct modulation of images and OAM modes could lead to cross-talk between decoded images. The use of convolution of images and OAM modes, such as through an addition of a lens, and the proper selection of OAM modes for different images (e.g., based on an analysis of the cross-talk) leads to significantly reduced cross-talk between OAM modes. Furthermore, the proper selection of OAM modes simplifies mode sorting, e.g., selecting only the desired image encoded mode and image to be decoded and sent to a particular direction. Upon passing through a decoding optic (e.g., a SLM with the opposite spiral phase profile), the desired image appears clear and distinct in the center of the decoded area. In contrast, the undesired modes (e.g., modes that do not match the desired mode profile) are deformed into a ring/annulus and can be removed by a spatial filter. Previously, separate steps were required for sorting (e.g., with a hologram) and decoding (e.g., with a SLM with spiral phase profile). Hence, the new 3D display system design simplifies the optical system.

Now, it may be useful to describe 3D display systems that make use of optical vortices and encoding/decoding with holographic techniques prior to turning to the new optical vortex 3D display systems. Such display systems may be implemented by using optical vortices (or OAM) to encode or multiplex multiple view or layer images into a single projection onto a holographic screen. The holographic screen(s) will then discriminate or demultiplex the different images in the single projection based on their OAM mode and either redirect each image into its corresponding direction (e.g., into one of three or more view zones in a multi-view 3D display), focus each image into its corresponding layer (e.g., for a multi-focal 3D display), or pass/scatter each image/layer at a plane corresponding with each of a number of layered screens (e.g., for a multiplanar or multilayer 3D display).

For a screen to act as a decoding screen in an optical vortex 3D display, the screen has to be able to discriminate between light intended for different views or planes. To this end, the light projected onto the screen is encoded with information, and the screen is adapted to be able to decode the light and act appropriately (treat the light in a predefined manner). Light waves have several intrinsic properties: amplitude, phase, wavelength, and polarization (related to photo spin angular momentum).

Light also possesses orbital angular momentum, which is related to the shape of the wavefront. The light wavefront can be shaped into a helical vortex using spiral phase plates, holographic diffraction gratings with fork dislocations, q-plates, and other devices. The pitch of the vortex (i.e., number of helical twists per wavelength) is called the topological charge and determines the amount of orbital angular momentum. Vortices with different pitches or charges can be combined together or multiplexed into a single beam and later separated/demultiplexed using, for example, holograms that can be the inverses of the encoding grating with fork dislocation. Unlike polarization that is limited to two distinct states/signals, OAM modes are theoretically unbounded. In other words, many different OAM signals may be combined and later separated at or by the display screen(s).

There are several approaches that may be taken to use OAM to multiplex and demultiplex images for 3D displays (which may be multi-view or multilayer displays). FIG. 1 illustrates an optical vortex multi-view display method 100 that may be carried out with the portions of a 3D display system shown. In a first step or Step A shown at 110, a number of images may be encoded into different OAM channels for later multiplexing together. In the example of FIG. 1, three view images 112, 114, 116 (e.g., three or more multi-view images) are provided, e.g., digital images of an object or scene from three differing points of view (POVs). In Step A, each image 112, 114, 116 is assigned or paired with a different OAM channel according to unique phase profiles as shown at 113, 115, 117 corresponding to a double twist, a single twist in that same/first direction, and a single twist in the opposite/second direction, respectively.

Then, in Step B as shown at 120, the output 122 of the first step 110 may be further processed to create three holograms 124, 126, 128. Each of the images 112, 114, 116 is multiplied by a diffractive grating with the appropriate fork dislocation for a desired topological charge as defined by phase profiles 113, 115, 117. As a result, each hologram 124, 126, 128 generates a different topological charge or OAM mode.

Next, as shown in the method 100 of FIG. 1, the output 132 of Step B is processed in Step C at 130 by adding together the individual holograms or encoded images 124, 126, 128 to form a single hologram 134 for display with a projector/display device. In FIG. 1, the hologram 134 is shown as an SLM hologram because, in many implementations of the display method 100, an SLM (e.g., a spatial light modulator in the form of an LCOS (liquid crystal on silicon) device, a DMD (digital micromirror device), or the like) is used or controlled to display the computer generated hologram 134. This may involve, as shown in Step C or step 130 in FIG. 1, operating a collimated light source 136 to provide a collimated beam 137 that is reflected off the SLM while it is displaying or being operated according to the single hologram 134.

As shown in Step D at 140, the output 142 from the SLM and its hologram 134 provides a beam 144 with multiple OAM channels 146, 147, 148 or the beam 144 may be labeled "multiplexed OAM beams" as shown in FIG. 1. In Step E at 150, the beam 144 is projected 152 onto a screen 154, which may take the form of a decoding hologram screen, and the screen 154 may be implemented in various forms depending upon the type of 3D display desired. For a multi-view display as shown in FIG. 1 in Step F at 160, the screen 154 may be a thick hologram created by interfering each OAM beam of a given topological charge with a collimated beam of a different angle of incidence.

When the encoded multichannel OAM beam 144 is projected 152 to impinge on the thick hologram of decoding hologram screen 154, the output 162 of the screen 154 is made up of each of the images 164, 165, 166, which are redirected as shown according to their previous OAM channel into different directions or into three different view zones 170, 172, 174 (e.g., at perpendicular to the plane of screen 154 and two offset angles from the perpendicular). Hence, the display method 100 displays a 3D image to a viewer(s) without the need for special glasses and with three views. Three views are shown in FIG. 1 (and other figures) to illustrate the displays taught provide 3 or more views/layers, and it will be understood that other embodiments may have 4, 5, 6 or more (e.g., 3-10 or more) views/layers. Other embodiments may use encoding and decoding schemes, such as using non-consecutive OAM modes, to reduce cross-talk between encoded and decoded images and OAM channels.

Figure 2:
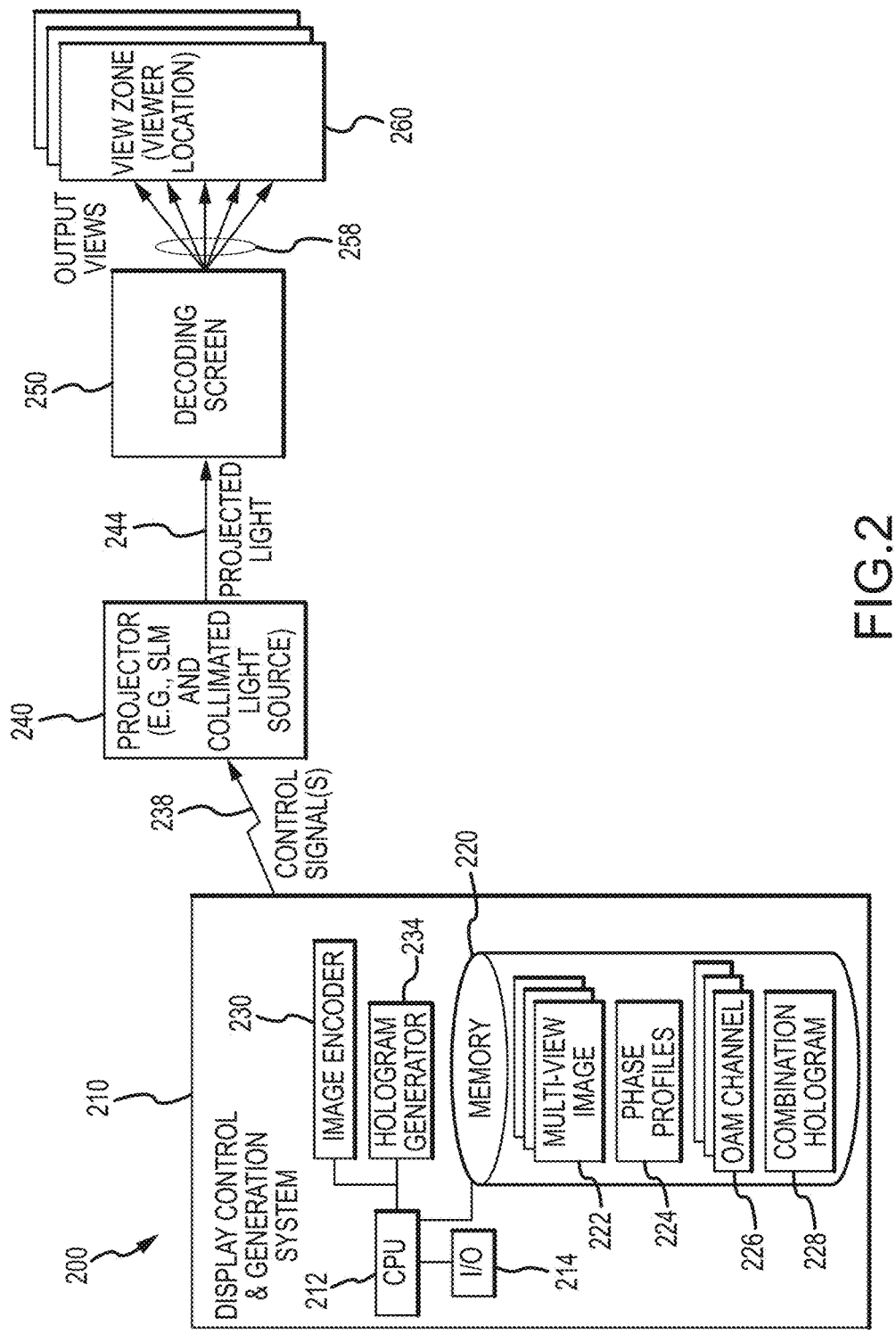
FIG. 2 is a functional block diagram of a 3D display system that may be used to provide the optical vortex display processes discussed herein such as those shown in FIGS. 1 and 3-5.

FIG. 2 illustrates an optical vortex 3D display (or display system) 200 that may be used to implement the display techniques taught in this description including the method 100 of FIG. 1. The system 200 includes a display control and image generation system 210, a projector/display device 240, and a decoding screen(s) 250. The control/generation system 210 includes a processor 212 and input/output devices 214, such as a keyboard, a mouse, a touchscreen, and the like. The processor 212 manages operation of the I/O devices 214 such as to allow a user to initiate image encoding and hologram generation with modules 230 and 234 and to select multi-view images 222 for combining (how many views or layers are to be displayed, what is the image/video stream to be combined for display, and so on) and phase profiles 224 for use in encoding each of the selected images 222.

The processor 212 also executes code (e.g., computer programs stored in computer readable media that when executed by the processor 212 cause the system 210 to perform the 3D display functions described) to provide an image encoder 230 and a hologram generator 234. The processor 210 manages memory devices 220 (or accesses digital data in memory via wired or wireless communications over a communications network). For example, the memory 220 is used to store a number of multi-view images 222 that may be encoded for projection as a single beam/stream of light 244 onto a decoding screen 250 via projector/display device 240. An operator, for example, may select all or a subset of the multi-view images (or image streams, with these terms being interchangeable in this description as the display often will be a still 3D display as well as a 3D video display) for combining using optical vortices or OAM modes.

To this end, the control system 210 may also select a number of default phase profiles 224, and each defines a different twist for a wavefront, or a user may be prompted to input these profiles 224 or select them from a list/set of possible phase profiles. Then, during operation of the system 200, the image encoder 230 acts to generate OAM channels 226 by encoding each of the selected multi-view images 222 using an assigned or paired phase profile 224 (e.g., amount of twist in one of a first or a second direction). Next, during operation of the system, the hologram generator 234 acts to combine the OAM channels or individual holograms 226 created by encoder 230 based on the images 222 and phase profiles 224. The individual holograms/OAM channels 226 are combined by generator 234 so as to form a single or combination hologram 228.

Then, the control system 210 may operate to transmit control signals 238 to cause the projector/display device 240 to generate or project a single light beam 244 onto a screen 250. The projector/display device 240 may take the form of an SLM combined with a light source such as a source of collimated light (e.g., a laser). In operation of the system 200, the projector/display device 240 may respond to control signals 238 by displaying the combination hologram 228 and projecting light onto the hologram to output light beam 244. The projected light 244 is directed onto a decoding screen or layered/spaced apart screens 250. The projected light 244 may be a single multichannel light beam containing OAM beams associated with each of the multi-view (or multi-layer) images 222.

When the display system 200 is implemented as a multi-view display as shown, the decoding screen 250 is configured to send each OAM encoded view 258 into a different direction or view zone 260. When the display system 200 is implemented as a multi-layer display, a number of screens 250 matching the number of views 222 and OAM channels 226 are provided in a spaced apart and layered manner (e.g., screen 250 is in a differing plane) to display three or more images 222 in three or more spaced apart planes or layers (e.g., the view zones 260 are replaced by view planes/layers 260 viewable without the need for 3D eyewear).

Figure 3:
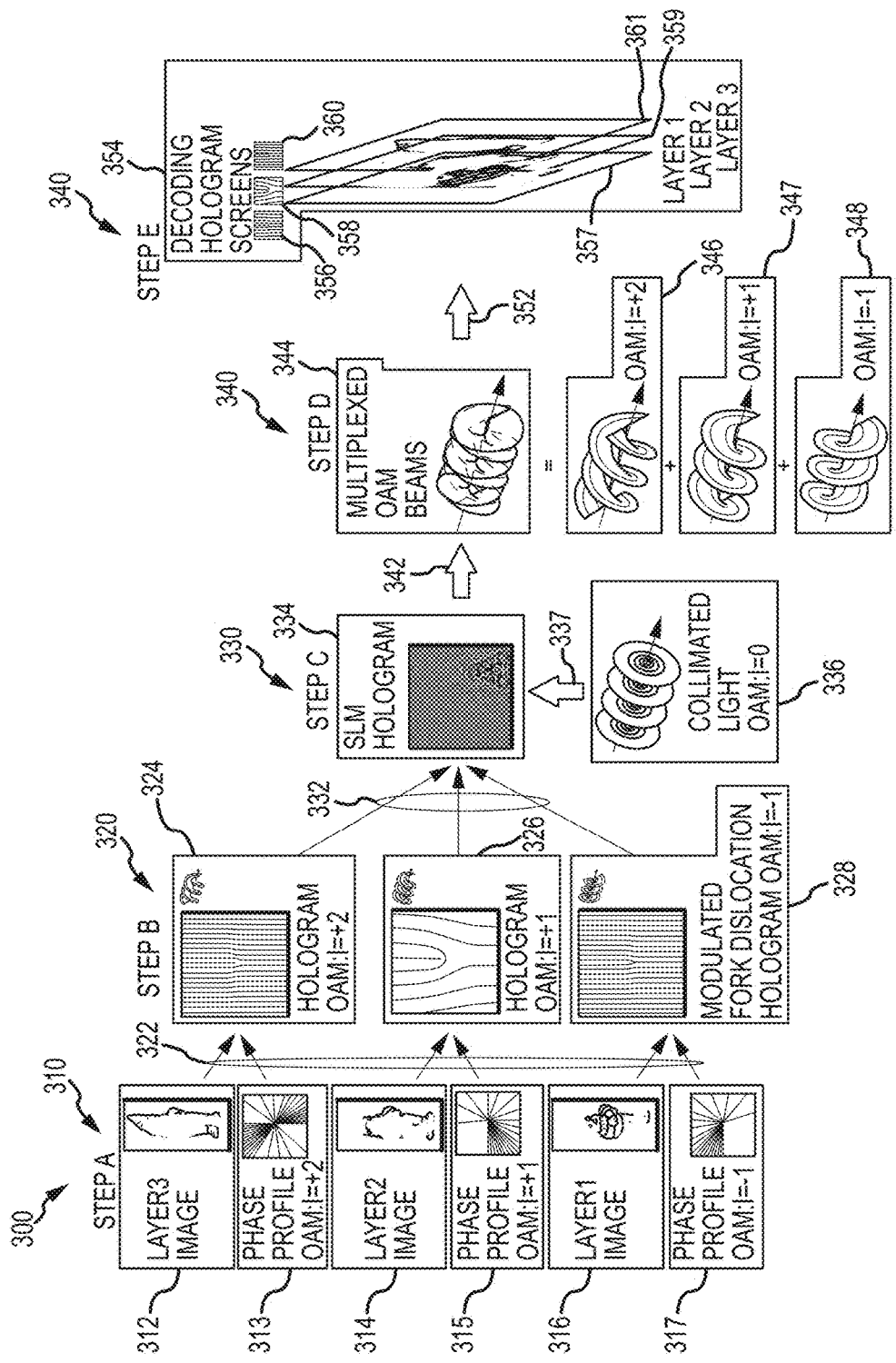
FIG. 3 is a schematic or functional illustration of components of an optical vortex multilayer display during operation (during performance of a 3D display method) to provide a 3D displayed image with three or more layers through the use of three or more decoding screens.

As discussed above, there are several approaches that may be taken to use OAM to multiplex and demultiplex images for 3D displays. FIG. 3 illustrates an optical vortex multi-layer display method 300 that may be carried out with the portions of a 3D display system shown (many of which may be present/used in the method 100, too). In a first step or Step A shown at 310, a number of images may be encoded into different OAM channels for later multiplexing together. In the example of FIG. 3, three layer images 312, 314, 316 (e.g., three or more multi-layer images) are provided such as in the form of digital images of layers or portions of an object or scene that are to be displayed in differing planes or layers (which may be 0 to 6 inches or more apart from each other to achieve a desired amount of depth or volume for a displayed object or scene). In Step A, each image 312, 314, 316 is assigned or paired with a different OAM channel according to unique phase profiles as shown at 313, 315, 317 corresponding to a double twist, a single twist in that same/first direction, and a single twist in the opposite/second direction, respectively.

Then, in Step B as shown at 320, the output 322 of the first step 310 may be further processed to create three holograms 324, 326, 328. Specifically, each of the images 312, 314, 316 is multiplied by a diffractive grating with the appropriate fork dislocation for a desired topological charge as defined by phase profiles 313, 315, 317. As a result, each hologram 324, 326, 328 has a different topological charge. Steps A and B may be thought of as providing a plurality of encoded images (or individual image holograms), and these steps may be performed by an "image source" such as the display controller and/or image generation system 210 of system 200 of FIG. 2.

Next, as shown in the method 300 of FIG. 3, the output 332 of Step B is processed in Step C at 330 by adding together the individual holograms or encoded images 324, 326, 328 to form a single hologram 334 for display with a projector/display device (note, this step may also be formed by the "image source" such as system 210 of FIG. 2). In FIG. 3, the hologram 334 is shown as an SLM hologram because in many implementations of the display method 300 a SLM is used or controlled to display the computer generated hologram 334. This may involve, as shown in Step C or step 330 in FIG. 3, operating a light source 336 to provide a collimated beam 337 that is reflected off the SLM while it is displaying or being operated according to the single hologram 334. As shown in Step D at 340, the output 342 from the SLM and its hologram 334 provides a beam 344 with multiple OAM channels 346, 347, 348 or the beam 344 may be labeled "multiplexed OAM beams" as shown in FIG. 3.

In contrast to method 100 of FIG. 1, the method 300 is performed to provide a multilayer display or to display an image or imagery made up of portions presented in spaced apart planes. To this end, the method 300 includes a Step E in which the projected beam 352 is directed onto a decoding screen assembly 354. The assembly 354 includes multiple, stacked (but typically spaced apart at least a small distance) demultiplexing or decoding hologram screens 357, 359, 361.

Significantly, each screen 357, 359, 361 is adapted to only scatter one OAM mode and pass the rest of OAM channels 346, 347, 348. Each screen 357, 359, 361 may be provided as a thick hologram, as shown with differing holograms 356, 358, 360. The holograms 356, 358, 360 may be created by interfering a single OAM beam of a single given topological charge with a diffuse beam. When the encoded multichannel OAM beam 344 impinges (as shown with arrow 352) on each thick hologram 356, 358, 360 of screens/projection layers 357, 359, 361, the image 312, 314, 316 corresponding to the OAM channel (or mode or topological charge) of that hologram 356, 358, or 360 will be scattered at that screen/layer 357, 359, or 361. The remaining light with the remaining OAM channels and associated images will pass through unaltered. The remaining channels will be decoded on their respective planes/layers 357, 359, or 361 by corresponding thick holograms 356, 358 or 360 tuned to the appropriate OAM topological charge or OAM channel.

When the encoded multichannel OAM beam 344 is projected 352 to impinge on the thick hologram of decoding hologram screen 354, the output of the screen 354 is made up of each of the images 356, 358, 360 carried by the OAM channels, which are redirected as shown into different directions or into three different view layers 357, 359, 361 (e.g., perpendicular to the plane of screen 354 and two offset angles from perpendicular). Hence, the display method 300 displays a 3D image to a viewer(s) without the need for special glasses and with three layers. Three views are shown in FIG. 3 (and other figures) to illustrate the displays taught provide 3 or more views/layers, and it will be understood that other embodiments may have 4, 5, 6 or more (e.g., 3-10 or more) views/layers.

The methods 100 and 300 of FIGS. 1 and 3 and the corresponding system 200 of FIG. 2 could also be implemented by providing an image carrying planar wave. For example, a collimated beam may be reflected off a LCOS/DMD or through an LCD panel. The image carrying planar wave may be passed through a spiral wave plate, which imparts a desired topological charge. Multiple beams with different encoded images can then be combined together in this display method (and corresponding optical vortex 3D display) such as through the use of a beam combiner (e.g., a half-silver mirror or the like).

Figure 4:
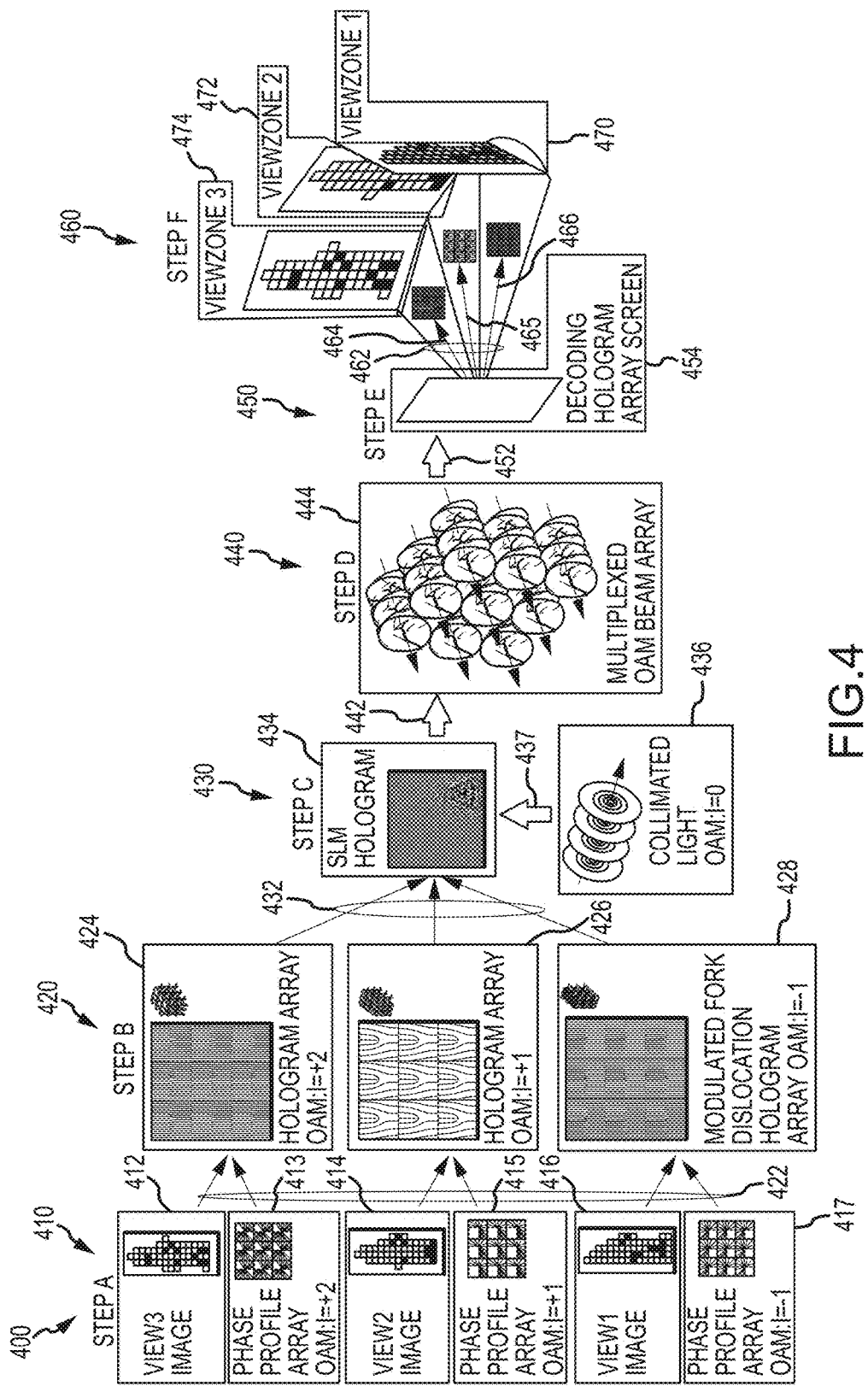
FIG. 4 is a schematic or functional illustration of components of an optical vortex multi-view pixelated display during operation (during performance of a 3D display method) to provide three or more views in different view zones via a decoding screen.

FIG. 4 illustrates an optical vortex multi-view pixelated display method 400. As shown at 410 in Step A (as compared with Step A in methods 100 and 300), each multi-view image 412, 414, 416 may be composed of an array of pixels or may be pixelated. Differing phase profile arrays may be assigned to these images as shown at 413, 415, and 417 such that each of the images is made up of "vortex pixels" all with the same OAM charge or twist.

In Step B at 420, the output 422 (i.e., the images 412, 414, 416 are encoded into different OAM channels 413, 415, 417) of Step A is used to form individual holograms 424, 426, 428, with each looking like an array of diffraction gratings with the same fork dislocation. Vortex pixels would be modulated in intensity/efficiency by the brightnesses of the corresponding pixels in the desired image. Different images would have vortex pixels of different OAM topological charges. Step B may be described as encoding the images 412, 414, 416 into different OAM channels with each channel being an array of encoded pixels of the same OAM topological charge.

Then, as shown at 430 in Step C, the output 432 of Step B or the individual holograms 424, 426, 428 are combined into a single hologram 434 that may be displayed on an SLM or other "projector" that is activated by reflecting a collimated beam 437 from a light source 436. The final hologram 434 is a sum of all the different vortex pixel images. In Step D as shown at 440, the output 442 of Step C provides an array 444 of multichannel light beams that in Step E at 450 are projected as shown by arrow 452 onto a decoding screen (e.g., a decoding hologram array screen) 454. The array 444 is made up of multiplexed beams with multiple OAM channels.

As shown at 460 in Step F, the decoding hologram array screen 454 sends at 462 the pixels 464, 465, 466 into differing directions or view zones 470, 472, 474 based on the OAM encodings. The screen 454 may be varied to suit the particular display method. For a multi-view pixelated display method 400, the screen 454 is a thick hologram with an array of the holograms 424, 426, 428 produced in Step B at 420. Each vortex pixel of the multiplexed beam 444 impinges 452 on a demultiplexing hologram array element in hologram array screen 454 to be directed 462 into differing view zones 470, 472, 474. Alternatively, the pixels could be focused to different depth(s) based upon their previous OAM encodings.

Figure 5:
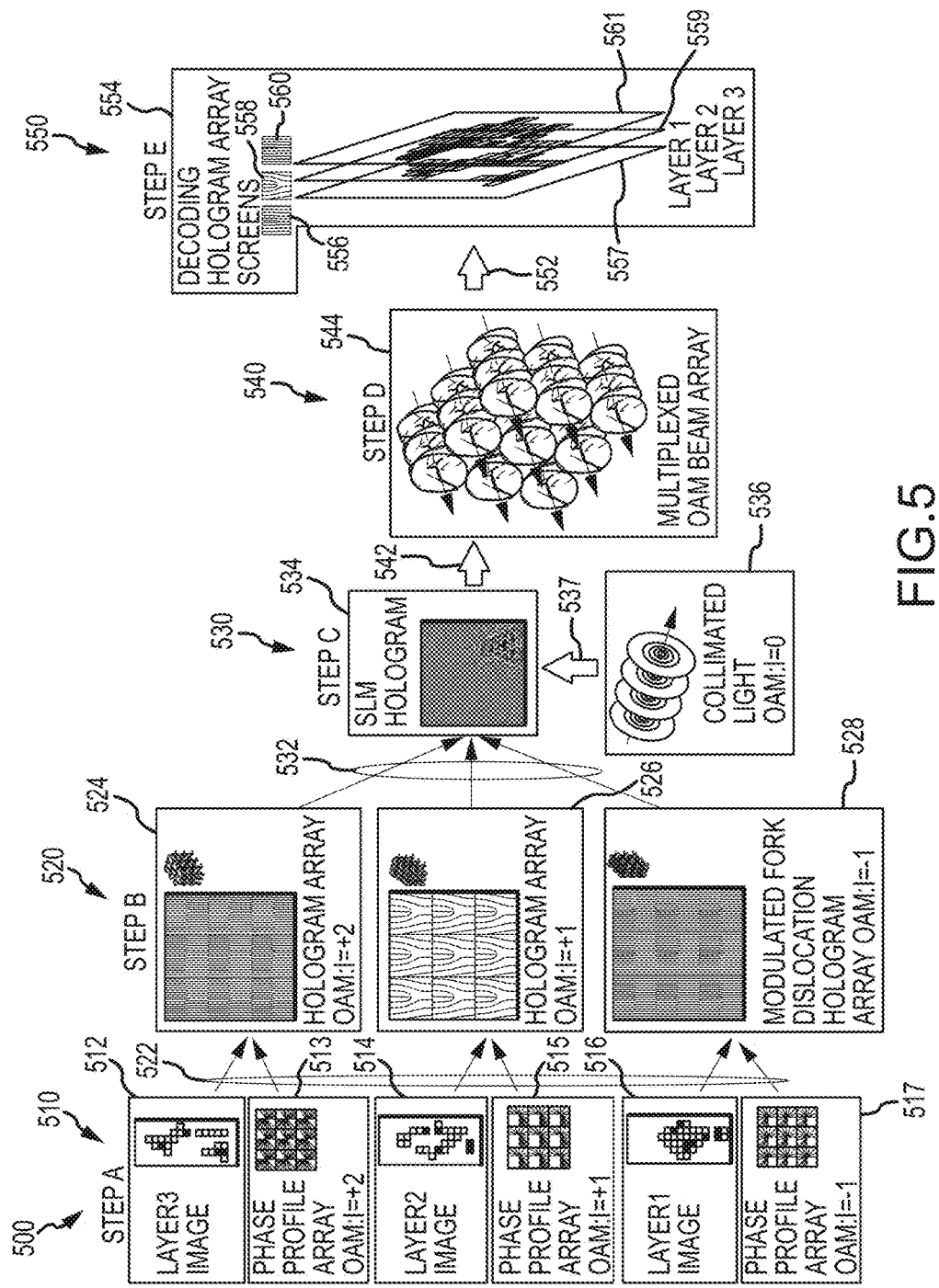
FIG. 5 is a schematic or functional illustration of components of an optical vortex multilayer pixelated display during operation (during performance of a 3D display method) to provide a 3D displayed image with three or more layers through the use of three or more decoding screens.

FIG. 5 illustrates an optical vortex multilayer pixelated display method 500. As shown at 510 in Step A, each multilayer image 512, 514, 516 may be composed of an array of pixels or may be pixelated, with each array associated with a portion of an image of an object or scene to be displayed on a plane/layer of a screen assembly 554. Differing phase profile arrays may be assigned to these images as shown at 513, 515, and 517 such that each of the images is made up of "vortex pixels" all with the same OAM charge or twist.

In Step B at 520, the output 522 (i.e., the images 512, 514, 516 are encoded into different OAM channels 513, 515, 517) of Step A is used to form individual holograms 524, 526, 528, with each looking like an array of diffraction gratings with the same fork dislocation. Vortex pixels would be modulated in intensity/efficiency by the brightness of the corresponding pixels in the desired image. Different images would have vortex pixels of different OAM topological charges. Step B may be described as encoding the images 512, 514, 516 into different OAM channels with each channel being an array of encoded pixels of the same OAM topological charge.

Then, as shown at 530 in Step C, the output 532 of Step B or the individual holograms 524, 526, 528 is combined into a single hologram 534 that may be displayed on an SLM or other "projector" that is activated by reflecting a collimated beam 537 from a light source 536. The final hologram 534 is a sum of all the different vortex pixel images. In Step D as shown at 540, the output 542 of Step C provides an array 544 of multichannel light beams that in Step E at 550 is projected as shown by arrow 552 onto a decoding screen assembly (e.g., a set of decoding hologram array screens with a number matching the number of layer images 512, 514, 516). The array 544 is made up of multiplexed beams with multiple OAM channels.

As shown at 550 in Step F, the assembly or stack 554 receives as shown with arrow 552 the OAM beam array 544. The array 544 is made up of a stack of spaced apart layers or screens 557, 559, 561 each configured according to a differing hologram 556, 558, 560 (with each corresponding to one of the holograms 524, 526, 528). As can be seen, the method 500 tracks Steps A-D of method 400, but the method 500 differs with regard to Step E as shown at 550.

Each layer 557, 559, 561 is configured to demodulate one OAM channel (as defined by phase profiles 513, 515, 517) so that the appropriate encoded layer of pixels are scattered or displayed on the corresponding layer/plane of screen 557, 559, or 561. Each screen 557, 559, 561 may be provided as a thick hologram as shown at 556, 558, 560 with an array of the holograms 524, 526, 528 produced in Step B as shown at 520. Each vortex pixel of the multiplexed beam 544 impinges 552 on a demultiplexing hologram array element in one of the screens 557, 559, 561 provided in three stacked layers in assembly 554.

Some of the examples shown above or herein were used to encode three images using optical vortex techniques, but three images were used only to illustrate that the methods are useful for combining at least three images that can be displayed in three layers/planes or three differing view zones (directed in three directions from a decoding screen). In some implementations, though, 4 to 10 or more images may be encoded using the methods and systems described herein and then displayed in 4 to 10 or more view zones or on 4 to 10 or more layers/planes. Alternate schemes to encode the images into each OAM mode may be used to reduce the cross-talk between nodes. The OAM nodes may be spaced or non-consecutive so as to reduce cross-talk between the modes.

The optical vortex 3D displays and methods provide a number of advantages over prior multiplexing and display techniques. Temporal encoding requires synchronization between the projector and screen, and high speed projection is also required. Spatial multiplexing reduces resolution and requires fine alignment for projection of subpixels behind lenslets. Additionally, blow by and space requirements limit the number of screen layers in such displays. Angular multiplexing requires multiple projectors and a large optic. Wavelength multiplexing is expensive due to the color filter (e.g., two sets of colors), and costs would increase for even narrower wavelength discrimination (e.g., more color sets equals more views or layers). This technique also involves a need to match mixed colors created from different color sets. Polarization multiplexing only supports two components or views (unless combined with spatial multiplexing). Virtual planes between the two physical scattering planes can be created but with a reduction in the field of view and with a limitation that the planes are not independent.

In contrast, the optical vortex 3D displays (and associated display methods) use OAM multiplexing and demultiplexing using a single projector and a single passive screen (or passive screen assembly in a multi-layer embodiment). No synchronization or high speed projection is required. The number of OAM channels is not limited to two and is ideally not bounded at all. Hence, many or multiple view zones or layers are addressable with a single projector.

The above description teaches a 3D display system for generating an optical vortex display visible by viewers without the need for special eyewear. The system includes a display controller providing a set of three or more images and also includes a projector projecting light that is a combination of the three or more images. The display system further includes a screen assembly displaying the three or more images on three or more screens, in three or more view zones to provide an autostereoscopic display, or focusing to three or more focal planes.

In some implementations, the system is a multi-view display, and the screen assembly includes a decoding screen sending the projected light in different directions for display in the three or more view zones. In such implementations, the projected light may include a number of multiplexed beams with differing optical angular momentum (OAM) modes and wherein each of the OAM modes is associated with one of the three or more images. Further, the three or more images each may be presented using a hologram that encodes one of the three or more images based on one of the OAM modes. In operation, the decoding screen functions to decode the holograms to scatter the projected light into the three or more view zones. To this end, the holograms associated with each of the three or more encoded images can be combined into a single combination hologram on a spatial light modulator (SLM) displaying the single combination hologram, and the projecting light step or functionality may include reflecting collimated light off the SLM while the single combination hologram is displayed.

In some cases, the projected light is made up of an array of beams each associated with a pixel of one of the three or more images and with an OAM mode associated with one of the three or more images. In these cases or implementations of the system, the three or more images each can be provided as an array of pixels using a hologram array encoding pixels of one of the three or more images based on one of the OAM modes. Then, the decoding screen can be adapted to decode the hologram arrays to direct the projected light into the three or more view zones or to focus the projected light into three or more layers. Further, the holograms can be combined into a single combination hologram, the projector may be a spatial light modulator (SLM) displaying the single combination hologram, and the step or functionality of projecting light may include reflecting collimated light off the SLM while the single combination hologram is displayed.

According to other aspects of the description, the display system may be a multilayer display, and the screen assembly may include a set of spaced apart decoding screens each displaying one of the three or more images. In these systems, the projected light may include a number of multiplexed beams with differing optical angular momentum (OAM) modes, and each of the OAM modes is associated with one of the three or more images. The three or more images can each be presented using a hologram encoding one of the three or more images based on one of the OAM modes, and the decoding screen can be adapted to decode the holograms to scatter the projected light at a specified screen or to allow it to pass unaffected to another of the three or more other screens. Further, the holograms associated with each of the three or more images can be combined into a single combination hologram, the projector can include a spatial light modulator (SLM) displaying the single combination hologram, and the step or functionality of projecting light may include reflecting collimated light off the SLM while the single combination hologram is displayed.

In the multilayer embodiment, the projected light may instead include an array of beams each associated with a pixel of one of the three or more images and with an OAM mode associated with one of the three or more images. In such cases, each of the three or more images can be provided as an array of pixels using a hologram array encoding pixels of one of the three or more images based on one of the OAM modes. Then, the decoding screen may be adapted to decode the hologram arrays to scatter the projected light at a specified screen or to allow it to pass unaffected to another of the three or more other screens. Further, the hologram arrays can be combined into a single combination hologram, the projector can include a spatial light modulator (SLM) displaying the single combination hologram array, and the step or functionality of projecting light may involve reflecting collimated light off the SLM while the single combination hologram is displayed.

According to another aspect of the present description, a method is provided for generating a three dimensional (3D) display. The method includes displaying a hologram that combines three images encoded into three different OAM channels, and the method also includes reflecting light from the displayed hologram to create a multichannel light beam. Then, the method involves decoding the multichannel light beam to decode and display the three encoded images.

In some cases, the decoding step includes displaying the three encoded images in decoded form in three view zones or on three spaced-apart planes. In such cases, the decoding can be performed by a single decoding screen using holograms used for directing the three decoded images or by a single decoding screen using holograms used for focusing the three decoded image planes. In other cases, the decoding is performed by three decoding screens configured based on a differing one of the holograms used for generating the three encoded images.

In performing the method, the displaying of the hologram step can include operating a spatial light modulator (SLM) to display the hologram on a screen of the SLM. Then, the reflecting of the light step may involve directing collimated light onto the screen of the SLM. In this or other implementations of the method, the hologram may be a combination of three holograms each encoding one of the three images according to one of three phase profiles defining a unique OAM mode.

According to yet another aspect of the present description, an optical vortex 3D display method is provided that includes encoding first, second, and third images to have first, second, and third OAM modes. In practice, the first OAM mode differs from the second OAM mode and the first and second OAM modes differ from the third OAM mode (i.e., each OAM mode is unique to uniquely encode each image). The method further includes generating a hologram combining the encoded first, second, and third images. Also, the method includes operating a projector to use the generated hologram to output a multiplexed beam including light associated with the encoded first, second, and third images.

This method may include using a decoding screen to decode each of the first, second, and third images in the multiplexed beam and to direct the decoded images into first, second, and third directions, respectively. In another case, this method may include using a decoding screen to decode each of the first, second, and third images in the multiplexed beam and to focus the decoded images into first, second, and third planes, respectively. In other cases, though, the method includes using a first decoding screen to decode and display the first image in the multiplexed beam on a first plane, using a second decoding screen to decode and display the second image in the multiplexed beam on a second plane spaced apart from the first plane, and using a third decoding screen to decode and display the third image in the multiplexed beam on a third plane spaced apart from the first and second planes. In some implementations, the encoding step/process includes generating first, second, and third holograms from the first, second, and third images. In this or other implementations, the projector operating includes displaying the generated hologram on an SLM and reflecting collimated light off of the displayed hologram. The images and encodings may vary in time to generate animated images.

With this base of understanding of OAM technology in mind, it may now be useful to describe an automultiscopic display or optical vortex 3D display system discovered by the inventors that uses pixel-based encoding along with transformation optics (in place of the holograms discussed above) to provide more light efficient encoding/decoding. Briefly, each image is encoded out in pixels (is pixelated) and then is decoded for display with its "opposite." These optical vortex 3D display systems include transformation optics to turn the spiral phase into an angle phase (e.g., a spiral into a linear gradient). Corrector optics are included to provide phase correction, and a sorter sends out the images at different angles (or into different viewing planes/layers). This optical assembly is provided for each pixel (e.g., different "donuts" go off at different angles as explained below in detail).

Orbital angular momentum (OAM) of light has drawn increasing attention due to its intriguingly rich physics and potential for a variety of applications. Having an unbounded set of orthogonal states, OAM has been used to enhance the channel capacity of data transmission. The inventors discovered and demonstrated the viability of using OAM to create an automultiscopic display (or optical vortex 3D display system). In this display or display system, multi-view image information is encoded using an OAM beam array and then sorted into different view directions using coordinate transformation elements (or "transformation optics"). A three-view demonstration was achieved to encode and decode 9 by 9 pixel images (e.g., with encoding/decoding on a pixel basis for each of the images). These demonstrations of the new display system suggested to the inventors that OAM can be practically implemented and used as an additional platform for future 3D display systems.

As further background to understanding the new optical vortex 3D display systems, it will be understood that the recent convergence of advances in display technology, image capturing, signal processing, and optical communications has generated a paradigm shift in how information is collected, conveyed, and rendered. This area of research has been rapidly developed due to the widespread use of flat panel displays (FPDs) and spatial light modulators (SLMs), especially those displays based on liquid crystals (LCs). In particular, the production of and consumer interest in 3D content and display technologies (such as virtual reality and augmented reality) have been increasing exponentially in the past few years. 3D display technology combines both rendering and conveyance of spatial information.

The state-of-the-art autostereoscopic 3D display technologies can be classified into the following three broad categories: (1) multi-view 3D displays; (2) volumetric 3D displays; and (3) digital holographic displays. Among existing multi-view encoded 3D display approaches, there are various mechanisms including: occlusion-based technologies (e.g., parallax barrier, time-sequential aperture, moving slit, and cylindrical parallax barrier), refraction-based (e.g., lenticular sheet, multi-projector, and integral imaging), reflection-based, diffraction-based, and eye tracking. One of the most significant drawbacks in these mechanisms or methods is the tradeoff between image resolution in each view and the number of viewpoints. Although using a display panel with smaller pixel size (e.g., 5 micrometers) could potentially increase the viewing angle while keeping the display resolution, the achievable number of views is limited, which compromises smooth parallax viewing. In addition to multi-view approaches, a number of binocular (or two-view) stereoscopic 3D display techniques have already been commercialized due to the high quality and low cost. However, the need to wear polarization or shutter glasses is a major concern. Polarization only supports two views, which only provides a single correct perspective and requires tracking for varying viewpoints, and shutter glasses require active glasses.

Advancements in fundamental science may pave the way for 3D displays with totally different technologies. For example, the wavefront completely characterizes the radiance flowing through all the points in the plane, in all possible directions, and of all possible curvatures. One goal of 3D display system designers is to truthfully reproduce the wavefront, but it is almost impossible to practically realize due to its huge information requirements. Instead, a sub sampling of views is implemented to mimic the 3D information. Different views are encoded and multiplexed through various means, then separated when the information is received by the observer. The use of multiplexing and demultiplexing in free space and optical fiber communications has benefited from the encoding/decoding using light's various degrees of freedom, which include wavelength/frequency, amplitude/phase, time sequence, and polarization of light. Each of these degrees of freedom can be solely or jointly implemented to achieve high data-carrying capacity. Similarly, the development of multi-view 3D display techniques has been focused on separating view channels with respect to independent variables, e.g., time multiplexing (time) and integral imaging (space).

Angular momentum is one of the most fundamental physical quantities in both classical and quantum physics. It has long been known that the circular polarization state of electromagnetic waves (e.g., visible light) is associated with spin angular momentum. In contrast, the orbital component of angular momentum in optics is affiliated with a vortex-like phase profile $e^{il\theta}$, where l is the topological charge and $\theta$ is the azimuthal angle. Optical beams with this helical phase have been shown to possess a well-defined OAM of lh per photon. In recent decades, OAM of light has drawn tremendous attention due to its potential application in communication, imaging, optical tweezers, and other applications. In particular, OAM is very attractive for data transmission due to its nature of unlimited number of potential states so that OAM beams can carry out an infinite amount of data in principle. It has been demonstrated that free space and optical fiber communication with OAM multiplexing/demultiplexing can work at broadband frequency with much higher data rate capacity. There are two approaches to increase the channel capacity with OAM, either by encoding information as OAM states of the beam or by using OAM beams as information carriers for multiplexing.

Figure 6:
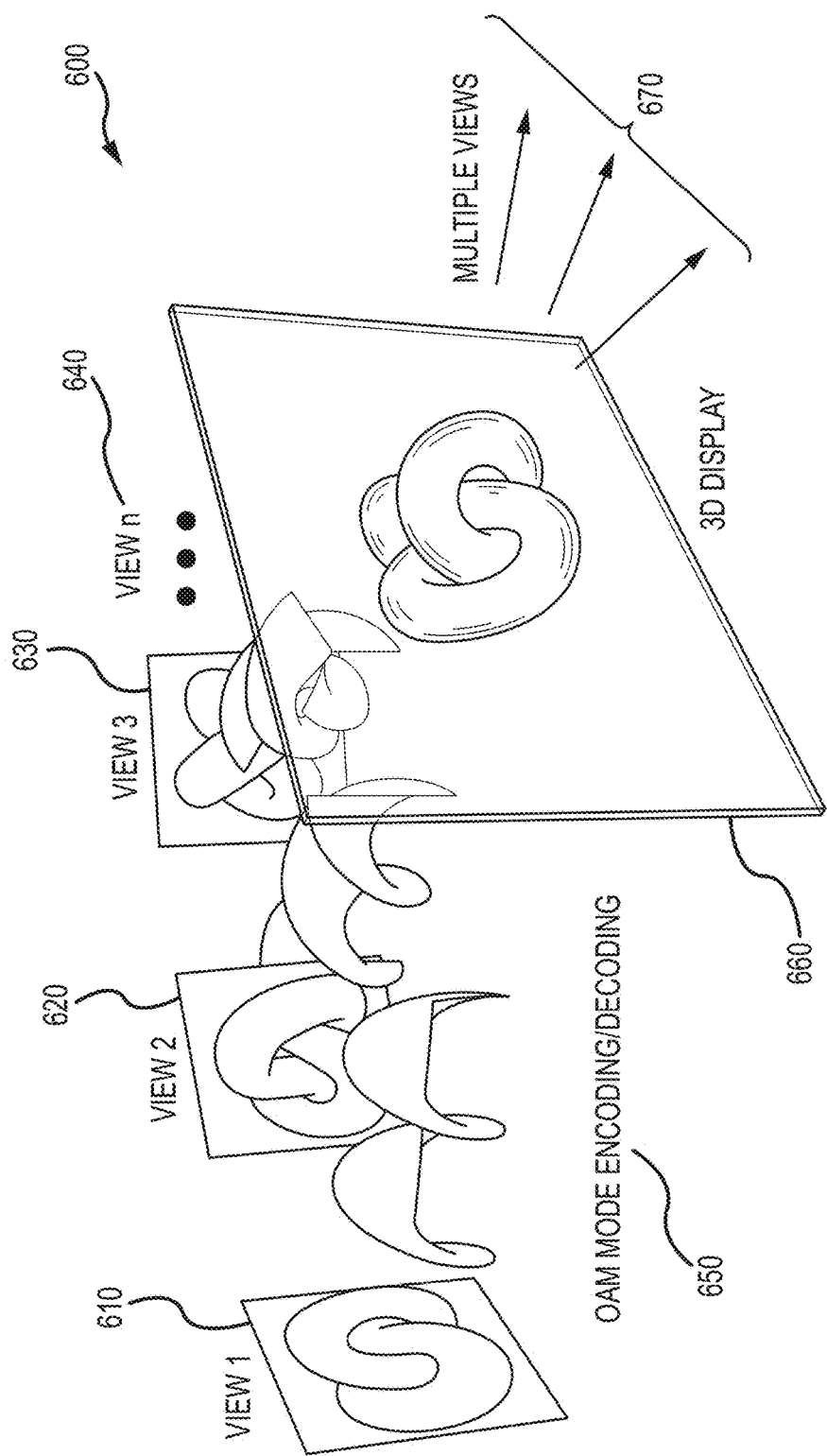
FIG. 6 illustrates a multi-view 3D display system of the present description using OAM mode encoding and decoding.

The inventors recognized that in the field of 3D display, if each view can be encoded with one of the OAM eigenstates, an optical vortex 3D display system can be constructed with unlimited views (theoretically). Such a 3D display system 600 is shown generally in FIG. 6 in which images 610, 620, 630, and 640 are processed to provide OAM mode encoding/decoding as shown at 650 to provide a 3D display 660 with multiple views as shown at 670. The system 600 may be thought of as a generalization of the particular 3D display systems shown in FIGS. 1-5 as well of the new implementations described below (beginning with reference to FIG. 7).

The inventors discovered a practical implementation for the system 600 that does not require use of holograms for encoding and decoding. Particularly, an autostereoscopic multi-view 3D display architecture or system was designed that provides pixel-based encoding/decoding and is based on the multiplexing and demultiplexing of OAM-carrying beams. In the following, a description is provided of the concept of encoding 2D image information using OAM modes, of multiplexing of different OAM channels, and of simultaneous separation of different images into various viewing angles. Experientially, a three-view proof-of-concept display is demonstrated, where three 9 by 9 pixel images were encoded and spatially separated using OAM beam arrays. The inventors' approach to design of an optical vortex 3D display system efficiently breaks the dependence between the number of available views and image resolution. Moreover, the compatibility between OAM-based 3D display and data communication may provide the possibility for all-optical collection, transmission, and rending of 3D information, and this may pave the way for the next generation of multi-view 3D display technologies.

Turning now to the concept and optics design for the new optical vortex 3D display system, for data transmission both in free space and optical fiber communications, OAM modes serve as a carrier of information, and they are regarded as an additional degree of freedom, which is complimentary to the existing multiplexing technologies thereby permitting a greatly increased data-carrying capacity. The information is generally encoded in a time sequential manner as a bitstream for each OAM channel. Thus, a 2D static image is typically transmitted pixel-by-pixel in a raster order, similar to the reciprocal way of a CRT display. Generally, a 2D image can be expressed as a 2D function associated with a complex field amplitude. In a conventional imaging system, this 2D information is imprinted onto the optical beam using an SLM. Due to the lack of complex phase structures in zero-order Hermite-Gaussian beams, the encoded images can be relayed without much distortion. However, direct superposition of the complex field of an image onto an OAM helical phase structure would lead to the breakdown of OAM eigen-modes in the far field and, therefore, large crosstalk between different channels.

It was understood by the inventors that there are another two mechanisms to incorporate the 2D information into OAM modes without disrupting the orthogonality between distinct states. These mechanisms are: (1) convolution between an image and an OAM mode; and (2) encoding the 2D amplitude distribution as an array of OAM beams, where each OAM element corresponds to one pixel of the encoded image. The 3D display systems taught herein employ the array approach due to the fact that the convolution method requires complex optics in order to separate different views while the array approach can benefit from the OAM mode sorting using coordinate transformation components.

Figure 7:
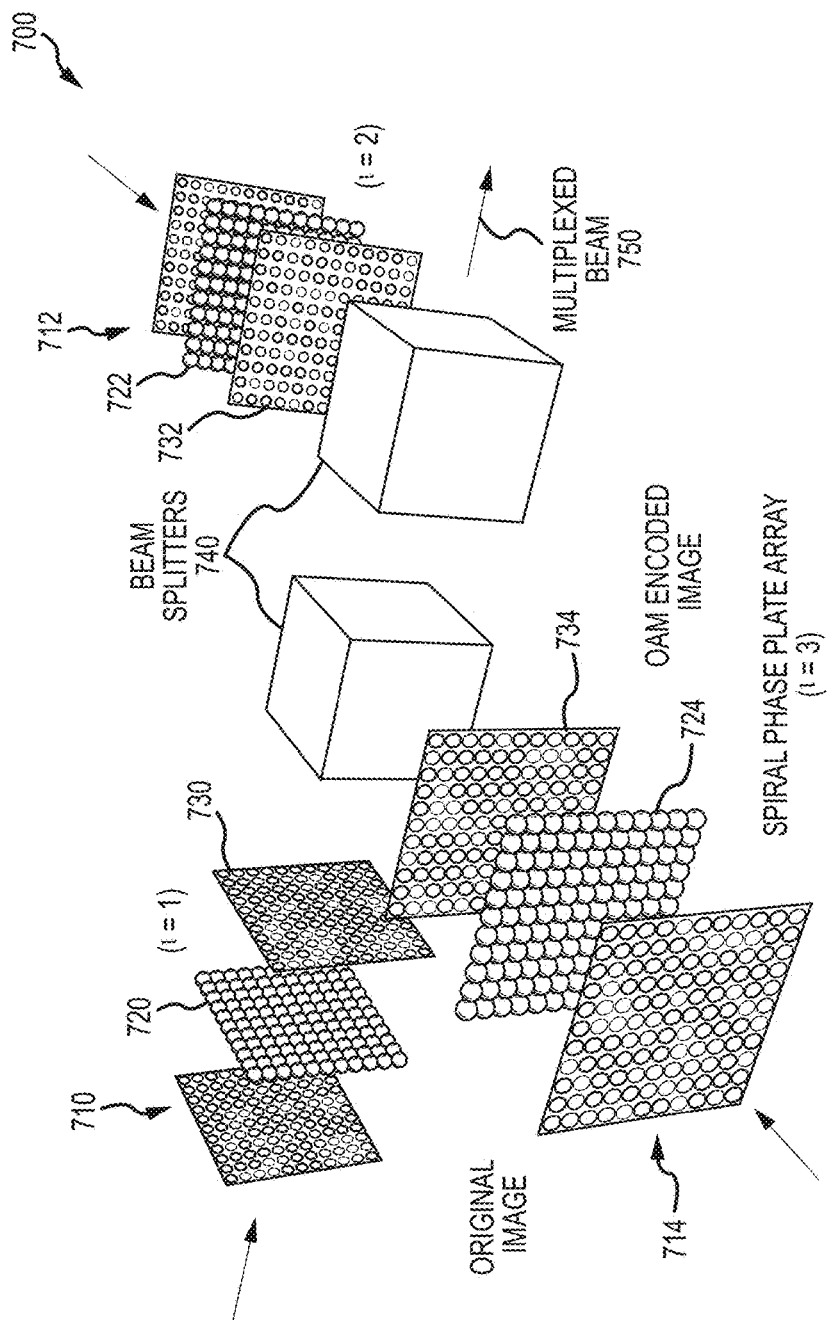
FIG. 7 is a schematic or functional representation of components of a new optical vortex 3D display system of the present description operating with OAM mode encoding/decoding on a pixel basis.

Once a number of images are encoded with different OAM modes, they can be multiplexed into one optical beam bundle using beam splitters. In this regard, FIG. 7 illustrates a portion of a 3D display system 700 that is operable to provide multiplexing of three images (three multi-view images as discussed with reference to FIGS. 1-5) with three OAM states. As shown, the 3D display system 700 during operations (e.g., during a first step or Step A) receives or retrieves three view images 710, 712, 714 (e.g., three or more multi-view images) such as digital images of an object or scene from three differing points of view (POVs). As shown, each digital image 710, 712, 714 is made up of a plurality of pixels.

A spiral phase plate array 720, 722, 724 is provided for processing light associated with each of the pixels of the images 710, 712, 714, respectively, with three different topological charges. In this way, the display system 700 produces three images 730, 732, 734 that are OAM encoded on a pixel-by-pixel basis (e.g., light associated with pixels of images 710, 712, 714 are assigned or paired with three different OAM channels). One or more beam splitters 740 are provided in the display system 700 to combine the three OAM encoded images 730, 732, 734 into a single optical beam or light stream 750 (e.g., for transmission to a projection screen (e.g., a demodulating or demultiplexing screen or optics as discussed with reference to FIGS. 1-5) for display in three different view zones). In other words, the "opposite" optics (not shown) can be used to decode the OAM encoded images. Unlike their use in communication systems, multiplexed OAM beams/such as beam 750) may only propagate a short distance (e.g., less than about 5 meters) before the information is decoded by an OAM sorter (which may be considered a part of the projector or projection optics that may be included in the display system 700) and projected to the imaging plane (e.g., into three or more view zones). Thus, the effect of air turbulence can be neglected in system 700.

To achieve the separation between different views, the coordinate transformation, which maps the azimuthal component (0–2π) into the Cartesian coordinates, can effectively unwrap a donut-like OAM beam into a rectangular shape with a tilted wavefront. An OAM sorter, which can be provided in the system 700 to receive the multiplexed beam 750, is configured to perform a mapping from the input plane (x, y) to the output plane (u, v), which can be described as: v=a arc tan(y/x) and u=−a ln($\sqrt{x^2+y^2}$/b). The phase profile of the transforming optical element is expressed as:

$$\phi_1(x, y) = \frac{2\pi a}{\lambda f}\left[y\arctan\left(\frac{y}{x}\right) - x\ln\left(\frac{\sqrt{x^2+y^2}}{b}\right) + x\right] \quad \text{Eq. (1)}$$

$$\phi_2(u, v) = -\frac{2\pi a}{\lambda f}\exp\left(-\frac{u}{a}\right)\cos\left(\frac{v}{a}\right) \quad \text{Eq. (2)}$$

where a=d/2π scales the size of the transformed beam and b determines the position of the output beam, λ is the wavelength of the light, and f is the focal length of the lens between the above two elements. By constructing an array of sorter and corrector pairs, the 3D display system 700 can be configured to effectively route different OAM beam arrays into different directions and generate a multi-view 3D image (e.g., the multiplexed beam 750 can be decoded and transmitted out at three different viewing angles into three viewing zones as discussed with reference to FIG. 1 allowing an observer or viewer to perceive the images 710, 712, 714 depending on their viewing angle or POV relative to the sorter/corrector device or assembly).

The designed phase profile can be generated using standard phase-only SLMs. However, diffraction-based SLMs have limited diffraction efficiency, and the pixelated nature of an SLM (e.g., pitch of about 10 micrometers) may result in poor performance of OAM sorting. With this problem in mind, the inventors discovered that it is more preferable for the 3D display system (e.g., system 700 of FIG. 7) to include refractive elements to carry out the sorting process (e.g., as part of decoding and/or demultiplexing the beam 750 for viewing), and the surface profile of the sorter can be arbitrarily manufactured using diamond machining, for example. In addition, a Fourier transform lens can be incorporated into the first element and corrected on the second element by another lens term. By carefully tailoring the parameters, the designed freeform surfaces can be fabricated on the front and back sides, respectively, of a single optical plate, which allows for compactness and precise alignment of optics.

An exemplary optical element 810 is shown in FIGS. 8A and 8B to provide the sorting and correcting functions (e.g., for sorting of an OAM beam lattice in an optical vortex 3D display system such as system 700 of FIG. 7). As shown, the optical element 810 includes an optical plate or body 812 with a front side or surface 813 (e.g., facing the output surface of the beamsplitter(s) providing the beam 750 in FIG. 7) upon which is provided an array of correctors that are formed/provided as shown in height profile 814 for one of the correctors. The optical plate 812 also includes a second or back side 815 (e.g., facing a viewing space where one or more observers may view a multi-view image by receiving light output from the back side 815 of the optical element 810) upon which is provided an array of sorters, with each being configured with a height profile 816.

The inventors performed a simulation of this new optical vortex 3D display design. First, the generation of OAM beam arrays was considered. A variety of ways have been used to generate a single OAM beam with a helical phase profile, and these include use of a spiral phase plate, a q-plate, a combination of Hermite-Gaussian modes, and SLMs. A computer-generated hologram, as discussed above, can also be used, e.g., to transform a pseudo plane-wave laser beam into one with an exotic phase structure. In the system 700 and simulation, the inventors used spiral phase plates (SPPs) to provide the transformation optics. Particularly, the SPPs were used to generate Laguerre-Gaussian (LG) beams as OAM-carrying states with different indices l. An ABCD matrix method is applied to simulate the propagation and wavefront shaping of optical waves.

FIGS. 9A-9F shows graphically (e.g., with graphs 910, 920, 930, 940, 950, and 960) results of a simulation of operation of an optical vortex 3D display system of the present description (such as the system of FIG. 7 modified to include the optical element of FIGS. 8A and 8B). FIG. 9A displays with graph 910 the intensity of the simulated LG beam when a Gaussian beam with the waist size ($w_0$=1.0 mm) passes through a SPP with a charge (l=6). The inventors investigated the transformation of a single OAM beam to a square lattice of optical vortices using the beam copying device. As shown in the graph 920 of FIG. 9B, a phase-only hologram was used to make multiple coherent copies (here 9 pixels by 9 pixels with graph 920 showing a modeled intensity of a 9 by 9 array of OAM-carrying LG beams generated by a beam copying device) of the LG beams with identical amplitude and phase profiles. The phase structure of this element can be written as:

$$\Psi = \tan^{-1}\left(\frac{\sum_{m=-M}^{M} \gamma_m \sin[(2\pi s/\lambda)mx + \alpha_m]}{\sum_{m=-M}^{M} \gamma_m \cos[(2\pi s/\lambda)mx + \alpha_m]}\right) + \tan^{-1}\left(\frac{\sum_{n=-N}^{N} \gamma_n \sin[(2\pi s/\lambda)ny + \alpha_n]}{\sum_{n=-N}^{N} \gamma_n \cos[(2\pi s/\lambda)ny + \alpha_n]}\right)$$

Eq. (3)

where 2M+1 and 2N+1 are the number of copies of the OAM beam in horizontal and vertical directions, respectively. s is the angular separation between adjacent copy, while $\gamma_{m,n}$ and $\alpha_{m,n}$ are relative amplitude and phase parameters corresponding to separate diffraction orders. These parameters are optimized to achieve uniformity between the multiple copies. Then, light propagating through the diffraction beam splitter and a corrector was collected by an aligned lenslet array that directs the OAM beam array onto an image mask. The mask was also aligned with the beam array and produced the desired OAM-encoded view image. FIG. 9C shows with graph 930 the transmitted image of the letter "P" made up of OAM pixels as it may appear after passing through the image mask.

The sorter converts the azimuthal phase gradient into tilted plane waves (i.e., a linear phase gradient) with the tilt of a resting plane wave proportional to the pitch of a spiral wavefront $e^{ilx}$. The phase correction plate removes residual phase aberrations caused by the sorter element. Additional fan-out and phase correctors can be used to reduce the crosstalk between OAM modes. FIG. 9D shows with graph 940 the intensity of a coordinate transformed OAM beam (l=6) just after the phase corrector. Note, the transformed optical beam is not a perfect rectangular shape, but it, instead, has a sinusoidal distortion due to the nonzero skew angle of OAM beams. The parameters of the sorter used in the simulation were: d=8 mm and b=0.004. Passing the tilted wavefronts through a lens, the lateral position ($t_l$) of each focused beam varies with the tilt of the incoming plane wave. Hence the propagation direction of different transformed OAM beams can be expressed as: tan θ=

$$\frac{t_l}{f} = \frac{\lambda l}{d},$$

where θ is the divergence angle.

FIG. 9E shows the modeled intensity profile of the sorting of six equally superposed OAM modes on the image plane, while the index separation between adjacent modes is Δl=4. Although, these modes are well separated with each other on the imaging plane, the angular separation (Δθ=0.02° for d=8 mm) is still small compared with a conventional multiview 3D display)(Δθ>0.7°. Therefore, both the size of OAM beam and sorter parameter may be reduced to enable a noticeable viewing angle separation. FIG. 9F shows the intensity profile of the sorted OAM array made up of equally weighted LG beams with the scaling factor d=1 mm on each sorter pixel (e.g., an array of superimposed LG modes with l=-10, -6, -2, 2, 6, 10). If each OAM array is coded with a different mask image, a six view 3D display can be constructed using the sorter array.

In an experiment performed by the inventors, the input OAM test modes were generated by use of a SPP, which was manufactured using a laser direct writing method. The manufactured SPP had equally spaced sub-areas (10 mm by 10 mm) with an adjustable helical index l ranging from -8 to 8. The Gaussian beam emitted from a 632.8 nm HeNe laser was expanded by a pair of lenses ($f_1$=10 mm, $f_2$=100 mm) and illuminated onto the SPP, producing the desired OAM state sequentially. Two adjustable apertures were placed in front and at the back of the SPP, respectively, to remove the noise outside the area of the expanded Gaussian and LG beam.

FIG. 10A with graph 1010 shows a measured far-field intensity pattern of an OAM-carrying beam with a charge of l=6. In order to produce an OAM beam array with equally distributed energy and high diffraction efficiency, a Dammann grating structure was encoded onto a liquid crystal on silicon (LCoS) SLM (256 gray level, 15 micrometer pixel pitch). The advantage of using the Dammann grating instead of a fan-out component is that the beam copying process discussed above preferably includes both transformation and correction, which adds complexity into the optics alignment. In addition, the phase structure of a Dammann grating is binary, allowing for cost effective fabrication using standard photo-lithography and easy integration to other systems. The phase values on a Dammann grating, either 0 or π, are encoded on a series of transition points within each period. The positions of these transition points are optimized to achieve maximum diffraction efficiency. The Dammann grating (period of 150 micrometers) was designed according to transition points useful for achieving a 9 by 9 array of OAM-carrying beams as shown in graph 1020 of FIG. 10B. The observed OAM array exhibits good quality period and intensity distributions. The Airy ring pattern surrounding each OAM pixel was likely due to the use of circular apertures in the experimental set up.

The OAM sorter and corrector were designed to increase the measurement bandwidth by use of a larger aperture (d=18 mm) and a small element distance ($D_{1,2}$=300 mm). The two-part OAM sorting components were fabricated using a diamond machining method, and a three-axis ultra-precision lathe was used in combination with a fast tool servo system to provide a fast axis superimposed on one of the axes of the lathe. The generated OAM beam propagated through the elements, unwrapping the donut-like beam, and mapping the azimuthal coordinate into a transverse axis. FIG. 10C with graph 1030 shows the intensity of a coordinate transformed OAM beam with the charge of l=6, exhibiting good rectangular shape.

In order to demonstrate the sorting performance of a uniformly distributed OAM lattice, the sorted single OAM beam was illuminated onto the Dammann grating hologram displayed on the SLM and a CCD camera was placed at the focal plane of the final focusing lens. The measured OAM spectra are shown in graphs 1040, 1050, and 1060 in FIGS. 10D-10F, which correspond to OAM modes l=−4, 0, 4, respectively. The horizontal and vertical lines in these images mark the center of the zero order. The distortion to the desired elongated spot array arises from the misalignment of the optics. A shift in the transverse direction can be observed with a distance of 65.6 micrometers separating the adjacent OAM modes. This measured shift is consistent with the theoretical model $$t_l = \frac{\lambda l}{d}f,$$

which gives a lateral displacement of 17.6 micrometers for an increase of OAM mode difference Δl=1. The inventors observed a shift of pattern in the vertical direction due to the size of the OAM beam expanding with the increase of mode number. For example, the intensity of a normal zero order Hermite-Gaussian beam has its maximum at the beam center, while the intensity maximum of an LG beam lies on the ring. Therefore, a jump of spot centers can be observed in the original radical direction, as shown in FIGS. 10D-10F.

After demonstrating the sorting performance of the OAM beam array, the designed image masks were inserted into the optics for 3D display purposes. As shown with graphs 1110, 1120, and 1130 of FIGS. 11A-11C, a group of three image masks were designed providing the letters P, S, and G. These masks were fabricated on transparent films with the dark areas designed to block the incident light. FIGS. 11D-11F with graphs 1140, 1150, and 1160 show the observed image on the CCD when each letter was encoded with an OAM state, l=7, 0, −7, respectively. The shapes of the original images were well reconstructed in each case, and they include elongated pixels. The noise in these images was due to the scattering on the surface of the inkjet printed masks used in the experimental set up. Significantly, the three images in FIGS. 11D-11F were spatially separated due to the OAM mode difference providing a multi-view display. The transverse displacement in the horizontal axis was over 100 micrometers, which corresponds to a separation angle of 0.015 degrees.

With the simulation and/or experiments, the inventors have demonstrated a proof-of-concept three-view 3D display system based on the mode orthogonality between OAM-carrying optical beams. The difference in OAM mode index provides a convenient way to sort multiple images by constructing a multiplexed OAM beam array. However, the angle between each view can be very small (e.g., 0.015°) compared to that of a conventional multiview 3D display (>0.7°) due to the large size of the sorter element parameter (d=18 mm). As discussed above, the separation angle can be written as $$\theta = \arctan\frac{\lambda l}{d}$$

and a larger viewing angle can be achieved using sorter arrays with a smaller scaling parameter d. Manufacturing of sorting elements with size d<500 μm is totally within the fabrication capabilities of readily-available diamond machining equipment. Sub-micron resolution of a fast tool servo system can be obtained, which is sufficient for the tested optics design. Furthermore, the effective resolution of this 3D display system can be greatly improved with smaller pixel (OAM beam and sorter) size.

The inventors studied the angular separation between views, which is a design parameter of a multi-view 3D display. In addition, it was recognized that the coordinate transformation can be engineered to provide depth information of 3D scenes. The conformal mapping described herein explores the polar to Cartesian transformation, which unwraps the phase gradient in the aximuthal direction into a transverse one. A reciprocal process can be implemented in order to transform the phase gradient from transverse direction to the radial direction (e.g., Cartesian to polar). If a lens is placed behind the transformed pattern, beams with different OAM index l can be mapped to various depths along the beam axis. By combining both the angular tiling and depth mapping, a more comprehensive 3D display system can be constructed using images coded with OAM states.

Additionally, the inventors discovered that the radial component is also attached in the sorting process. This is because the beam waist enlarges with the increase of the OAM angular index l. If the radical and angular components of an OAM-carrying beam are separately resolved, parallax viewing in both the horizontal and vertical directions is possible. To achieve this, Fourier transform of Bessel beams can be chosen instead of SPP-generated LG beams, which can be produced by programming the phase pattern on phase-only SLM. The annular ring structure containing an azimuthal order can be arbitrarily engineered for simultaneous separation of OAM radical and azimuthal index by use of the sorter elements described herein.

To summarize this first design for a new 3D display system (using pixel-based encoding/decoding), the inventors have proposed and demonstrated both theoretically and experimentally a new multi-view 3D display architecture using OAM-based multiplexing and sorting. Information of different views are encoded into the OAM-carrying beam array and decoded with a sorting element array. The phase gradient provided by OAM provides a genuine tool for sorting different modes and allows for multi-view display. A three-view experiment was performed to demonstrate the pixel-based 3D display system, and this was sufficient to show capabilities beyond only two views as with polarization multiplexing. The separation angle between views can be further increased by using smaller sorter components. It is believed by the inventors that the 3D display system design may pave the way for many future 3D display technologies.

In other 3D display systems, it may be useful to encode/decode on an image-by-image basis rather than pixel basis, e.g., a whole view or level image would be encoded onto a single twist of light. Convolution can be used in such 3D display systems to eliminate ghosted image and to limit crosstalk. If the OAM modes are chosen properly (e.g., with enough spacing), a good image can be obtained in the center (rather than in outer ring(s)). In these new 3D display systems, it is also possible in some cases to eliminate separate coding and sorting as utilized in the above 3D display systems (pixel-based encoding and sorting).

The following discussion describes the inventors' investigation of encoding and decoding of 2D information using OAM of light. Spiral phase plates (SPPs) and phase-only SLMs were used in encoding and decoding of OAM states, respectively. The following description shows that off-axis points and spatial variable encoded with a given OAM state can be recovered through decoding with the corresponding complimentary OAM state. Light may carry spin angular momentum and orbital angular momentum (OAM). Spin angular momentum is associated with circular polarization of light, and OAM is a property of light related to the phase distribution of the optical wave front. Unlike spin angular momentum (i.e., polarization), which has only two orthogonal modes, OAM has theoretically an infinite number of orthogonal modes.

Beams having helical phase fronts described by $e^{il\varphi}$, where l can be an integer or fraction and $\varphi$ is the angular coordinate, have been shown to possess well-defined OAM of lh per photon. The theoretically unbounded state space provided by OAM beams enables enhanced free-space and fiber communications. Methods ranging from diffractive optics, spiral phase plates, and mode converters to q-plates are used to generate OAM beams. In general, bits of data are either encoded as OAM states of the beam or carried by the amplitude of the on-axis point of the OAM beam, then decoded from a multiplexed beam. OAM mode-division multiplexing is used in combination with other multiplexing schemes to achieve additional degrees of freedom and increase channel capacity. While coding one-dimensional information in OAM modes has been demonstrated, coding 2D information has not been extensively studied prior to the inventors' efforts described herein.

Figure 12A:
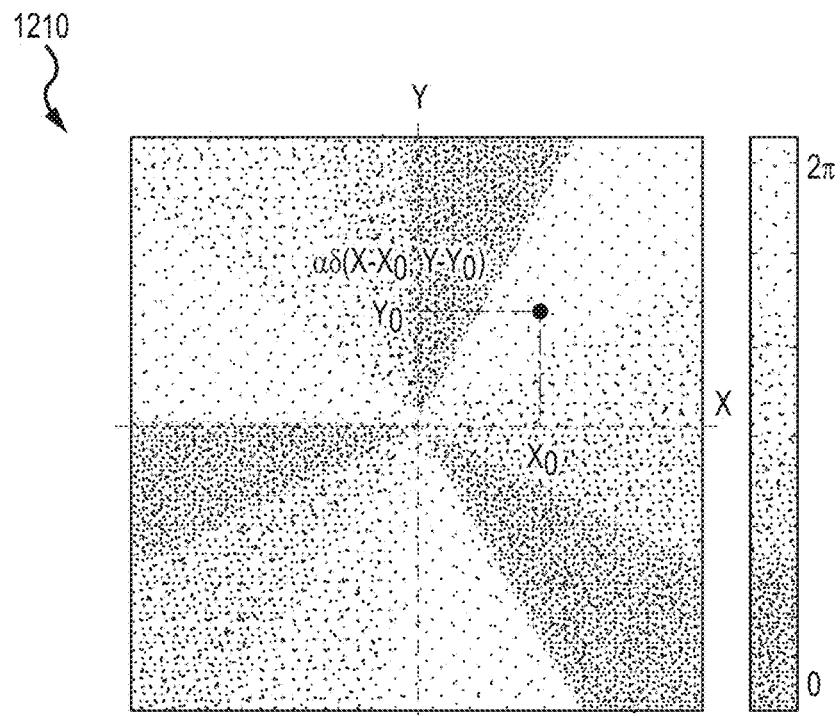
FIGS. 12A-12C show, respectively, a sketch or graph of an off-axis point modulated by an OAM state, a graph of a normalized amplitude of Eq. (6) when charge l=3 (e.g., the amplitude profile is calculated by evaluating the integral in terms of weighted sums of Bessel functions and Struve functions, and a graph showing radial intensity.

In the following paragraphs, the use of OAM beams is described in coding two-dimensional patterns. In an attempt to code and image with OAM, the image was decomposed into an on-axis point and off-axis points. FIG. 12A with graph or sketch 1210 shows coding of an off-axis point with OAM. Assuming x and y are two independent variables of the cardinal coordinate, $\varphi$ is the azimuthal angle in the polar coordinate, and $l_1$ and $l_2$ represent two states of OAM. Then, an off-axis point with amplitude $\alpha$ and phase $\varphi$ can be denoted as:

$$g(x,y)=\alpha\delta(x-x_0,y-y_0)e^{i\varphi} \quad \text{Eq. (4)}$$

As the off-axis point is encoded and decoded with OAM states $l_1$ and $l_2$, respectively, the resultant far field is found to be:

$$G(f_x,f_y)=F\{g(x,y)e^{il_1\varphi}e^{il_2\varphi}\} \quad \text{Eq. (5)}$$

where $f_x$ and $f_y$ are two independent variables of the cardinal coordinate after the Fourier transform. Working together, the encoding and decoding of the OAM state modulates the point with the updated spiral phase characterized by $e^{il\varphi(x,y)}$, where $l=l_1+l_2$. When $l=0$, the decoding OAM state cancels the encoding OAM state, and the far field contains Fourier information of the original point in that:

$$G(f_x,f_y)=F\{g(x,y)\}=\alpha e^{i\varphi}e^{-i2\pi(f_x x_0+f_y y_0)} \quad \text{Eq. (6)}$$

When $l\neq 0$, the decoding OAM state does not match the encoding state. Following the convolution theorem, the far field can be found by:

$$G(f_x,f_y)=F\{g(x,y)\}\otimes F\{e^{il\varphi}\}=\alpha e^{i\varphi}e^{-i2\pi(f_x x_0+f_y y_0)}$$
$$\otimes F\{e^{il\varphi}\} \quad \text{Eq. (7)}$$

Figure 12B:
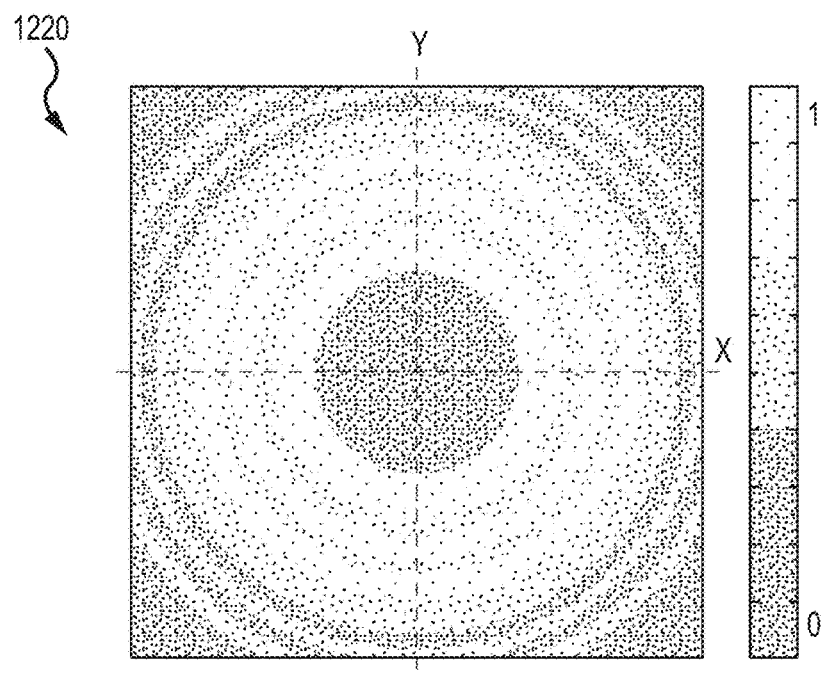
Figure 12C:
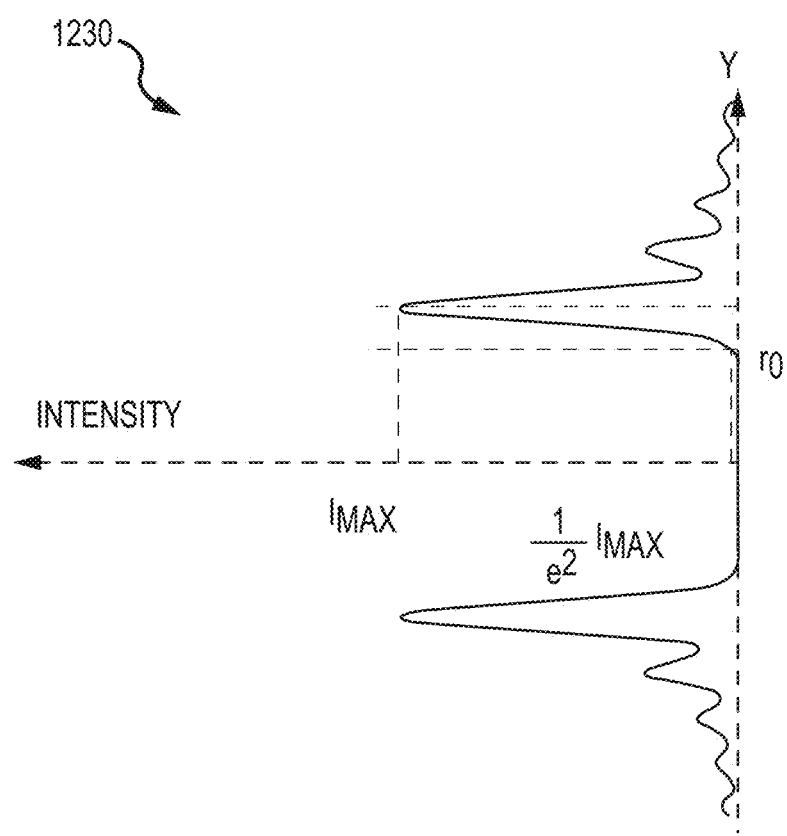

One can then define $Z_1(x)=\int_0^x tJ_l(t)dt$, where the function $J_l$ is the l order Bessel function of the first kind. The Fourier transform of spiral phase is then given by:

$$F\{e^{il\phi}\}=\frac{1}{(2\pi r)^2}(-i)^l z_l(2\pi\rho_0 r)e^{il\theta} \quad \text{Eq. (8)}$$

where $(r, \theta)$ is the polar coordinate in the $(f_x, f_y)$ plane and $\rho_0$ is radius of the spiral phase affected. Eq. (8) describes a kernel with circular symmetry, with the amplitude of a circular central region close to 0. Calculated amplitude profile and radial intensity are sketched in graphs 1220 and 1230 in FIGS. 12B and 12C, respectively. One can then find the radius $r_0$ of the central dark region at $1/e^2$ of the maximum intensity. Since the spectrum of a delta function extends uniformly over the entire frequency domain, encoding and decoding of a single point with unmatched encoding and decoding OAM states results in a centered dark region.

Contributed by the on-axis point and all the off-axis points, information of a 2D pattern can be preserved by encoding and decoding with matched OAM modes. For patterns encoded and decoded using unmatched OAM states, the resultant far field contains a hole, which is spatially separable from useful information decoded with a matched OAM state. In a multiplexed beam, multiple two-dimensional patterns are coded with a series of OAM states:

$$A(x,y)=\Sigma_m A_m(x,y)e^{il_m\varphi} \quad \text{Eq. (9)}$$

Decoded by a spiral phase $e^{il_0\varphi}$ corresponding to a selected OAM state, the far field can be expressed as:

$$G(f_x,f_y)=F\{\Sigma_m A_m(x,y)e^{i(l_m+l_0)\varphi}\} \quad \text{Eq. (10)}$$

Due to the linearity of the Fourier transform, the far field after encoding, multiplexing and decoding are given by:

$$G(f_x,f_y)=\Sigma_m F\{A_m(x,y)e^{i(l_m+l_0)\varphi}\}=F\{A_k(x,y)\}+\Sigma_{m,\,m\neq k}F\{A_m(x,y)e^{i(l_m+l_0)\varphi}\} \quad \text{Eq. (11)}$$

Decoded by a selected OAM state $l_0$, only the pattern encoded with the matched state $l_k=-l_0$ is preserved, while the energy of the other unmatched states are shifted outwards. Therefore, Fourier information of $A_0(x, y)$ is extracted after OAM modulation.

Figure 13:
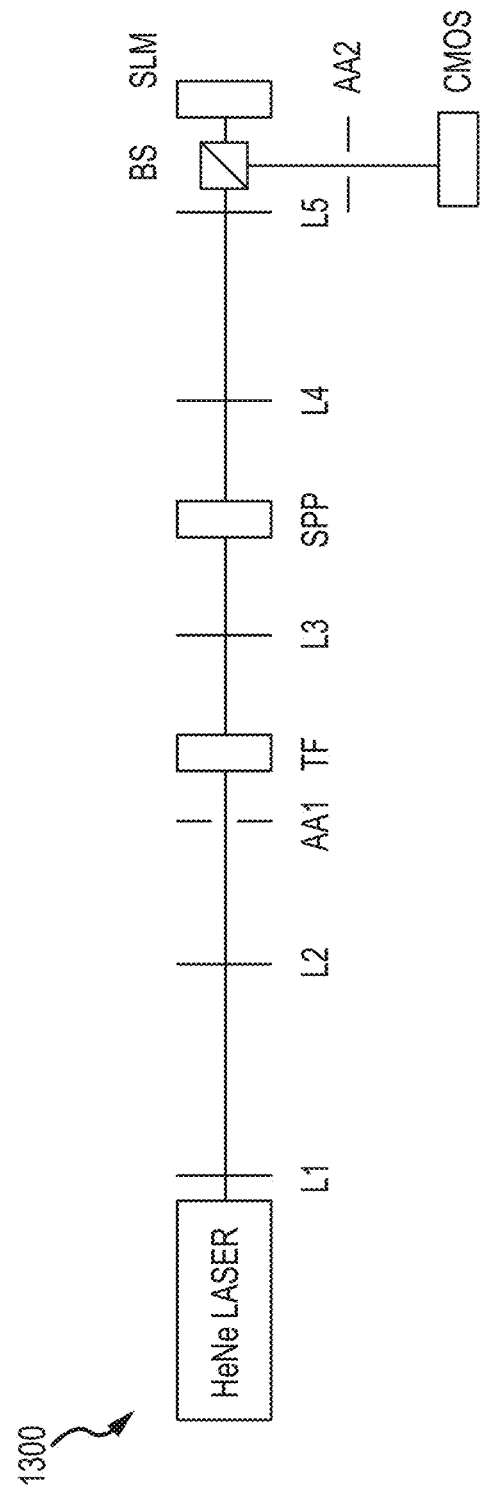
FIG. 13 is a functional block diagram or schematic of another embodiment of a 3D display system (or a portion of such a system) configured for encoding and decoding a 2D image with OAM.

FIG. 13 provides a functional block diagram or schematic of a 3D display system 1300 (or a portion thereof) that is configured for encoding and decoding a 2D image with OAM. In the system 1300, the components labeled L1 to L5 are lenses, the components AA1 and AA2 are adjustable apertures, component TF is a transparency film, component SPP is a spiral phase plate, component BS is a beamsplitter, and component SLM is a spatial light modulator. The system 1300 includes a light source in the form of a HeNe laser. The inventors used an implementation of the optical system 1300 to demonstrate experimentally the coding of one image with an OAM state (encoding on an image-by-image basis).

As shown, light emitted from laser (e.g., a 632.8 nm HeNe laser) was expanded by two lenses, L1 and L2, and illuminated on a removable transparency film TF, which imprints a 2D image onto the projected beam. An adjustable aperture AA1 was placed in front of the transparency film TF to remove the noisy outer portion of the expanded beam. A third lens L3 was inserted after the transparency film TF to adjust projection distance of the image. Information containing the image is incident on a spiral phase plate SPP with an $e^{il_0\varphi}$ phase distribution, encoding the transformed image into an OAM mode $l_0$. For decoding, the encoded pattern is relayed onto a phase-only LCoS spatial light modulator SLM using two lenses L4 and L5 in FIG. 13. A second adjustable aperture AA2 was used to filter out everything but the first diffraction order. Output of the display system 1300 was captured using a camera CMOS, and a beamsplitter BS was used to ensure perpendicular incidence on the spatial light modulator SLM.

As derived above, the pattern at the first diffraction order depends on the sum of the encoding and decoding OAM states. Without the transparency film, one would expect to see either a bright or a dark region in center, depending on whether the decoding OAM state cancels the encoding one so that the sum equals zero. With the transparency film's image coded to the beam, one instead expects to see projection of the pattern on the camera when the decoding OAM state matches the encoding OAM state. For unmatched encoding and decoding OAM states, one expects to obtain a convolution of the encoded pattern and the kernel with a dark region in the center. In the inventors' experiment, the encoding OAM states were generated by the use of spiral phase plates. The SLM displays a forked diffraction grating (i.e., a spiral phase distribution with a blazed linear grating) with adjustable charge to create different decoding OAM states at the first diffraction order. The blazed grating is used to separate out the zero order from the first order.

Figure 14A:
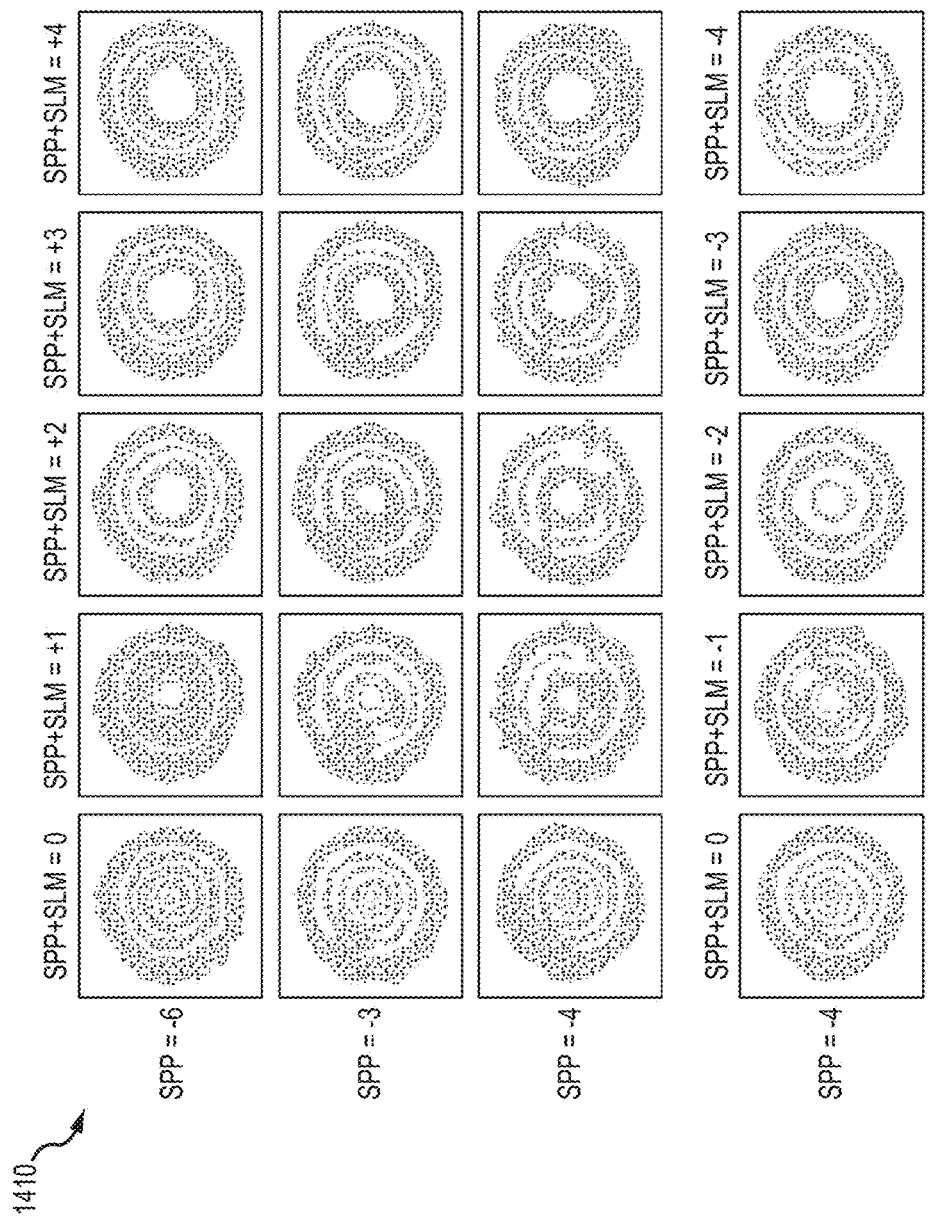
FIGS. 14A and 14B show, respectively, observed intensity profiles at the first diffraction order when no image is coded and observed intensity profiles at the first diffraction order for a range of decoding OAM states when a 2D pattern is coded (note, the encoding OAM state prepared by the spiral phase plate was −4, and, when no spiral phase was encoded or decoded, the first diffraction order diffracted by the blazed grating displayed on the SLM was recorded as a reference)

FIG. 14A shows at 1410 a set of observed intensity profiles in the case that no image is coded. When the encoding spiral phase plate is removed and the SLM just displays a blazed grating (no spiral decoding phase), the first diffraction order of the output is recorded as a reference. With an encoding spiral phase plate and decoding SLM forked diffraction grating, when the sum of the OAM states equals 0, a bright intensity occurs in the center. Acting as an updated OAM state, a centered dark region occurs when the decoding OAM state does not cancel the encoding OAM state. The radius increase with the absolute value of the sum of the coding (encoding and decoding) OAM states.

Figure 14B:
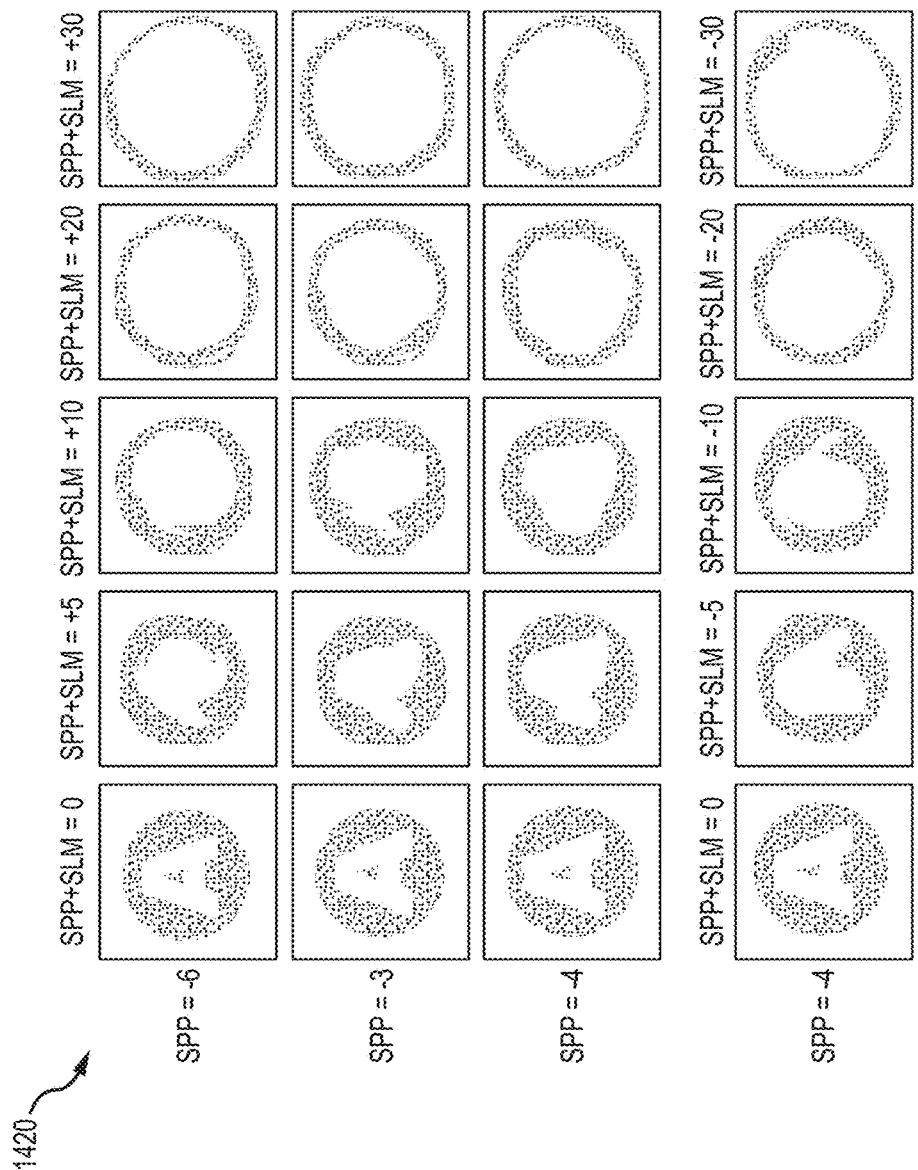

FIG. 14B shows a set of observed intensity profiles in the case that 2D information on a transparency film is coded with OAM. Without encoding or decoding OAM states, the reference is just the projection of the transparency film diffracted by the SLM's blazed grating. The 2D pattern is then encoded on the transparency film with an OAM state $l_0 = -4$ prepared by a spiral phase plate. Compared to the reference, the 2D image can be decoded using the SLM to display a phase dislocation with charge $l_k = +4$. As the absolute value of the sum of the encoding and decoding OAM state increases, a dark region gradually appears in the center of the image, with some features of the projected image surrounding the hole. As the absolute value reaches a large enough magnitude, the central region becomes large enough so that the size of the dark region is larger than that of the decoded 2D image. When the decoded image and the circular pattern are mapped together, they are spatially separable, which indicates that information coded with unmatched OAM states has no impact on the information coded with matched OAM states, considering only the central region, even if they are mapped and mode-multiplexed into a beam bundle. In FIG. 14B, a bold Arial character "A" was encoded with a height of 5 mm. The size of the dark region reaches sufficiently large size when the absolute value of the sum exceeds 30, in this particular experiment.

Figure 15:
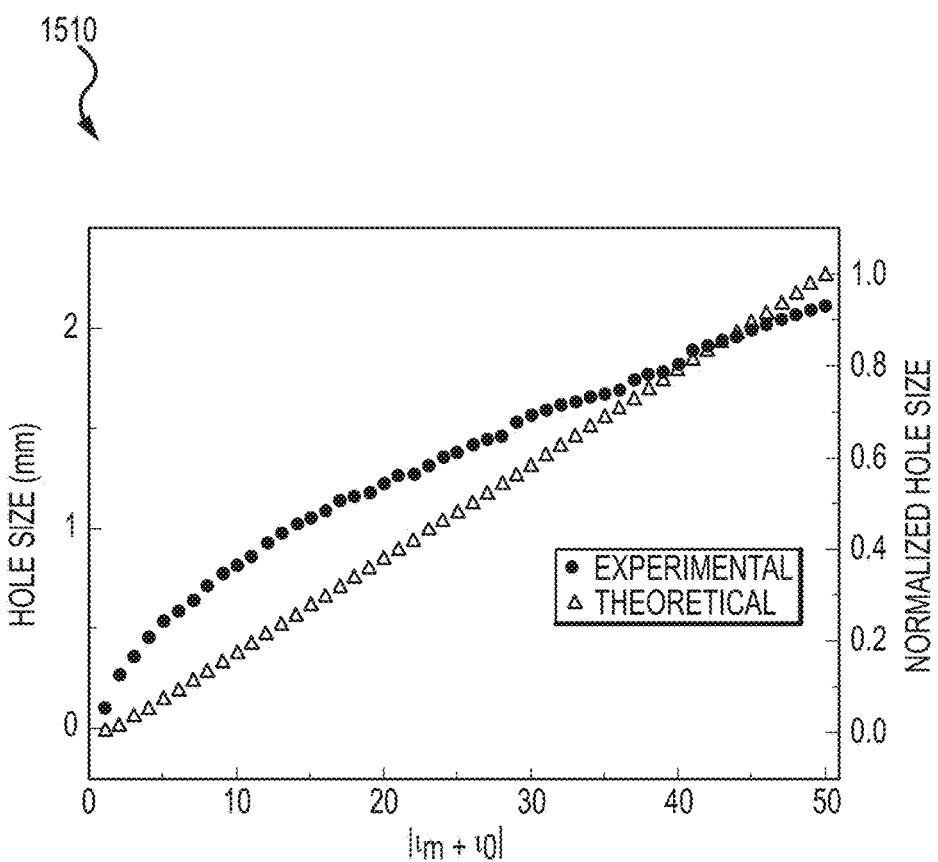
FIG. 15 is a graph showing modelled and measured radius of the central dark region with respect to absolute values of the sum of the encoding and decoding OAM states.

In order to show that the experimental 3D display system can code larger images, the inventors created a range of encoding and decoding OAM states with specific beam waists. The radius of the central dark region of the light encoded by the OAM states $l_0 = -4$ and decoded by a set of sequential OAM states was studied and shown in graph 1510 of FIG. 15. The trend of the calculated radii agrees well with experimental results in that the size of the dark region increases with the sum of encoding and decoding OAM states, which means a larger sum allows coding of larger images to be separated from unwanted rings. However, generation of OAM beams with larger l values is more problematic in that they require higher resolutions of spiral phase. Though the state space provided by OAM is theoretically infinite, the trade-off between image size and coding states may set limits to decoding images from a multiplexed OAM beam.

Figure 16:
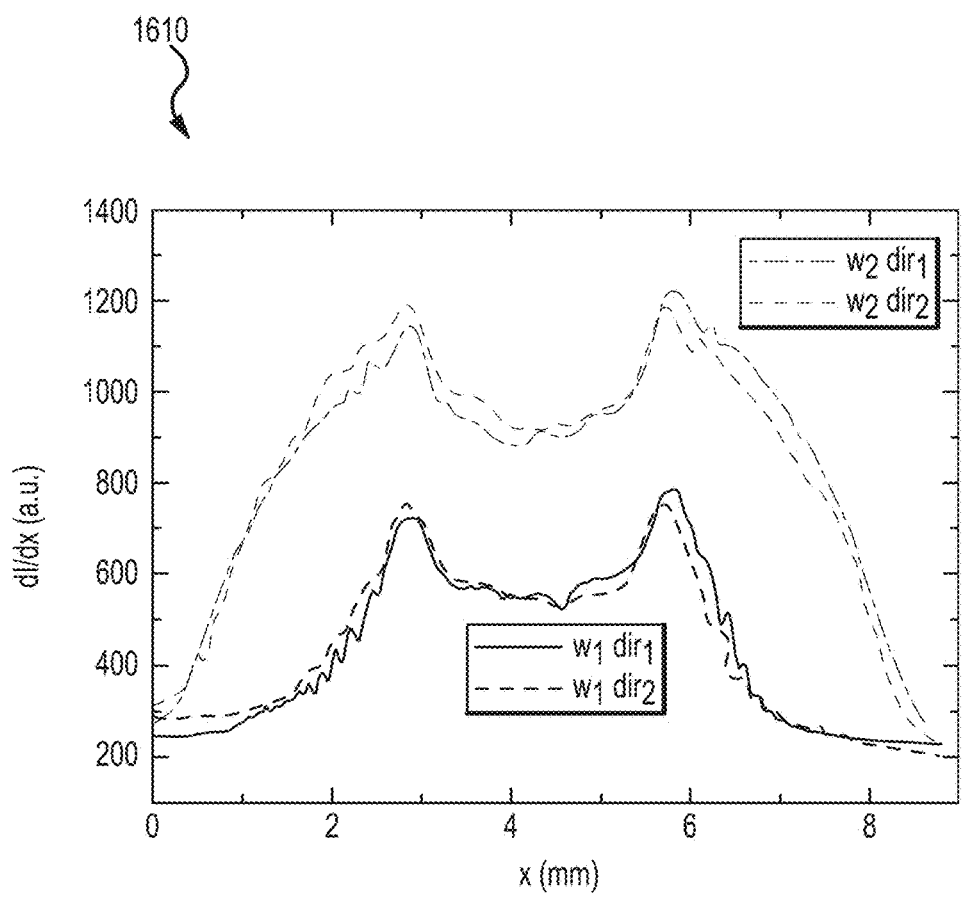
FIG. 16 is a graph showing the derivative of energy with respect to two directions.

In addition to the radius of dark regions provided by different OAM states, the energy distribution of outside rings present can be characterized using different beam waists of the incident light. Intensity of part of a generated ring is summed along one axis and derivative of energy with respect to the axis is calculated. FIG. 16 shows with graph 1610 that the energy distribution of an outside ring is symmetrical with respect to the radial direction. Moreover, the derivative of energy reaches its highest value at the same position for all beam waists, which confirms that the radial positions of highest intensity of the rings are stationary. After the derivatives are maximal, they decrease proportionally with the radial distance, which indicates that the radius of dark regions for different beam waists can be found at the same radial positions as well. Therefore, selection of the coding OAM states may be less relevant with the exact patterns to be coded.

Figure 17A:
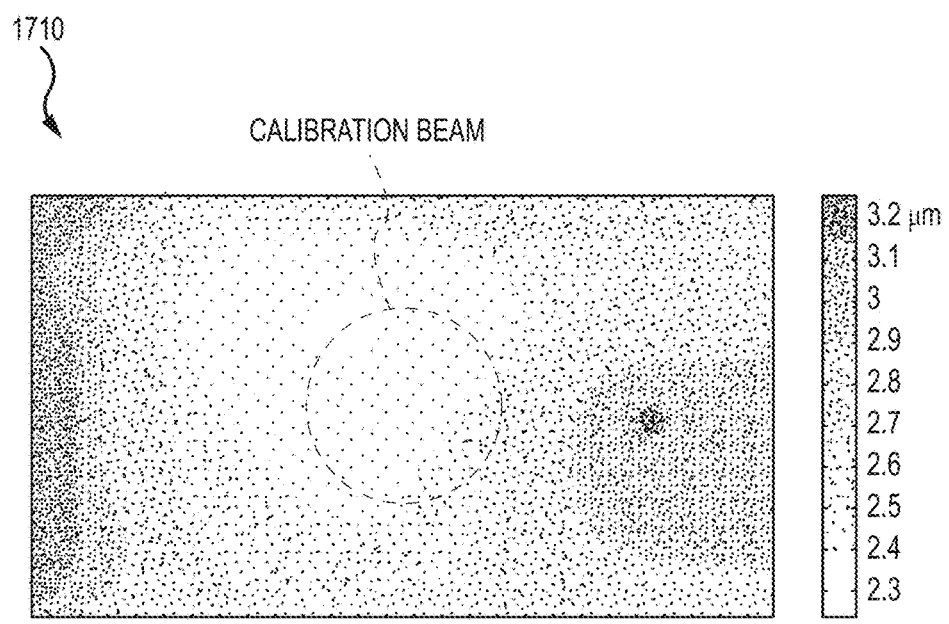
FIGS. 17A and 17B are, respectively, a graph providing thickness distribution of an LCoS SLM used in a 3D display system of the present description (e.g., the system of FIG. 13) and a graph showing ideal amplitude and calculated distorted amplitude due to phase departure introduced by thickness variation of the LCoS SLM.
Figure 17B:
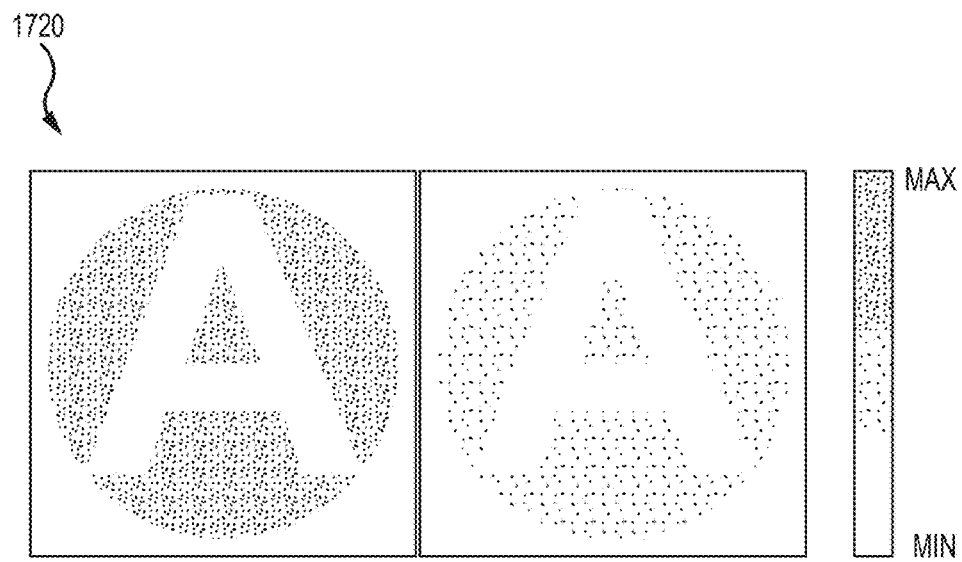

Thickness of the phase-only LCoS SLM used to create the decoding mode may vary across the surface (as shown with graph 1710 of FIG. 17A), which contributes to phase departure of the decoding spiral phase. In the central 5 mm area where the light is incident on, thickness varied from 2.644 to 2.2538 microns. In order to investigate its effect, the distortion introduced by thickness variation of the LCoS device across the surface was calculated. For calibration of the LCoS, the beam without OAM modulation and coding images is incident on the center of surface, where a binary grating is displayed. Within the area of the calibration beam, dependency of phase modulation of the LCoS on loaded gray scale pattern was averaged. However, in practice, the positions where the thickness of the LCoS surface is thicker than average modulate phase more than intended, and the thinner positions modulate less. The phase departure considering thickness variation was calculated and shown in graph 1720 of FIG. 17B. From FIG. 17B, it can be seen that 0.2π phase departure results in unevenness and also blur edges of the image. This may explain one of the reasons leading to imperfections of the regenerated image as shown in FIG. 14B.

In summary with regard to the image-based encoding/decoding display system, the inventors discovered and have described a 3D display technique that builds on the concept of coding and decoding 2D images with OAM states. The operability of such a 3D display system was also experimentally confirmed with the recovered information image being spatially separated from the unwanted peripheral ring patterns. The inventors also provided their analysis of the ring size of over 50 updated OAM states and showed the different image sizes that can be coded. The inventors believe that their teaching can be used in the applications of multi-channel optical communications as well as the multi-view displays taught herein (e.g., the optical system 1300 may be used to replace all or portions of the components shown in FIGS. 1-5 to provide multi-view or multi-layer displays to viewers without the need for special eyewear).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A display system, comprising:
a display controller providing light associated with two or more two dimensional (2D) images;
an optical assembly encoding the light associated with the two or more 2D images with optical angular momentum (OAM); and
a projection assembly displaying the two or more images on two or more screens positioned at two or more differing focal planes or displaying the two or more 2D images in two or more view zones to provide an autostereoscopic display,
wherein the optical assembly is configured to encode the light associated with each of the two or more 2D images into an array of OAM beams,
wherein all the OAM beams of each of the arrays of OAM beams is encoded with an OAM mode that differs for each of the arrays of the OAM beams,
wherein each of the OAM beams corresponds to a pixel of one of the two or more 2D images, and
wherein the optical assembly further includes transformation optics that converts a spiral wavefront of each of the OAM beams to a linear gradient wavefront.

2. The display system of claim 1, wherein the optical assembly comprises a spiral phase plate array for each of the two or more 2D images configured to encode light into the plurality of OAM beams according to one of the OAM modes.

3. The display system of claim 2, wherein the optical assembly further comprises a beamsplitter combining the OAM beams from the spiral phase plate arrays into a multiplexed beam.

4. The display system of claim 3, wherein the projection assembly comprises an optical element including an array of sorters configured to receive the multiplexed beam and direct light associated with the pixels of each of the two or more 2D images into a differing view zone.

5. A display system, comprising:
a display controller providing light associated with two or more two dimensional (2D) images;
an optical assembly encoding the light associated with the two or more 2D images with optical angular momentum (OAM); and
a projection assembly displaying the two or more images on two or more screens positioned at two or more differing focal planes or displaying the two or more 2D images in two or more view zones to provide an autostereoscopic display,
wherein the optical assembly provides the encoding through convolution of differing OAM modes on an image-by-image basis and the projection assembly is adapted to decode or sort the two or more 2D images after the convolution by the optical assembly.

6. The display system of claim 5, wherein the optical assembly comprises a differing spiral phase plate (SPP) for performing the convolution of the light associated with the two or more 2D images based on the differing OAM modes.

7. An apparatus for generating a 3D display, comprising:
a source of first, second, and third light streams comprising, respectively, light corresponding with a plurality of pixels of first, second, and third images; and
transformation optics adapted for encoding the first light stream into a plurality of beams according to a first OAM mode, encoding the second light stream into a plurality of beams according to a second OAM mode, and encoding the third light stream into a plurality of beams according to a third OAM mode, wherein each of the beams is associated with one of the pixels of the first, second, and third images and wherein the transformation optics turn a spiral phase of each of the beams into an angle phase.

8. The apparatus of claim 7, wherein the first, second, and third images are associated with first, second, and third points of view of an object or scene.

9. The apparatus of claim 7, further comprising an optical assembly combining the plurality of beams encoded in the first, second, and third OAM modes into a multiplexed beam and a sorter array receiving the multiplexed beam and directing light associated with the first image into a first viewing zone, light associated with the second image into a second viewing zone, and light associated with the third image into a third viewing zone.

10. The apparatus of claim 9, wherein the optical assembly includes a pair of beamsplitters.

11. The apparatus of claim 7, wherein the first OAM mode differs from the second and third OAM modes and wherein the second OAM mode differs from the third OAM mode.

12. The apparatus of claim 7, wherein the transformation optics includes a first spiral phase plate array with a first index for encoding the first light stream, a second spiral phase plate array with a second index for encoding the second light stream, and a third spiral phase plate array with a third index for encoding the third light stream.

13. A three dimensional (3D) display system, comprising:
an optical assembly receiving and encoding light associated with three 2D images according to first, second, and third optical angular momentum (OAM) modes;
multiplexing optics combining the encoded light into a multiplexed beam; and decoding optics receiving and decoding the multiplexed beam for display, wherein the optical assembly includes first, second, and third spiral phase plate (SPP) arrays each configured to encode the light associated one of the three 2D images into an array of OAM beams, and wherein each of the OAM beams corresponds to a pixel of one of the three 2D images.

14. The 3D display system of claim 13, wherein the multiplexing optics comprise at least one beamsplitter combining the OAM beams from the SPP arrays into the multiplexed beam and wherein the optical assembly further is configured to convert a spiral wavefront of each of the OAM beams to a linear gradient wavefront.

15. The 3D display system of claim 14, wherein the decoding optics comprise an array of sorters configured to receive the multiplexed beam and direct light associated with the pixels of each of the three 2D images into a differing view zone.

16. A three dimensional (3D) display system, comprising:
an optical assembly receiving and encoding light associated with three 2D images according to first, second, and third optical angular momentum (OAM) modes;
multiplexing optics combining the encoded light into a multiplexed beam; and
decoding optics receiving and decoding the multiplexed beam for display,
wherein the optical assembly provides the encoding through convolution of each of the three 2D images using the first, second, and third OAM modes and the decoding optics is adapted to decode or sort the multiplexed beam into the three 2D images after the convolution by the optical assembly.

* * * * *